April 17, 1951 R. E. MOULE 2,549,327
CAPSULE MAKING MACHINE AND METHOD
Original Filed June 5, 1944 14 Sheets-Sheet 1
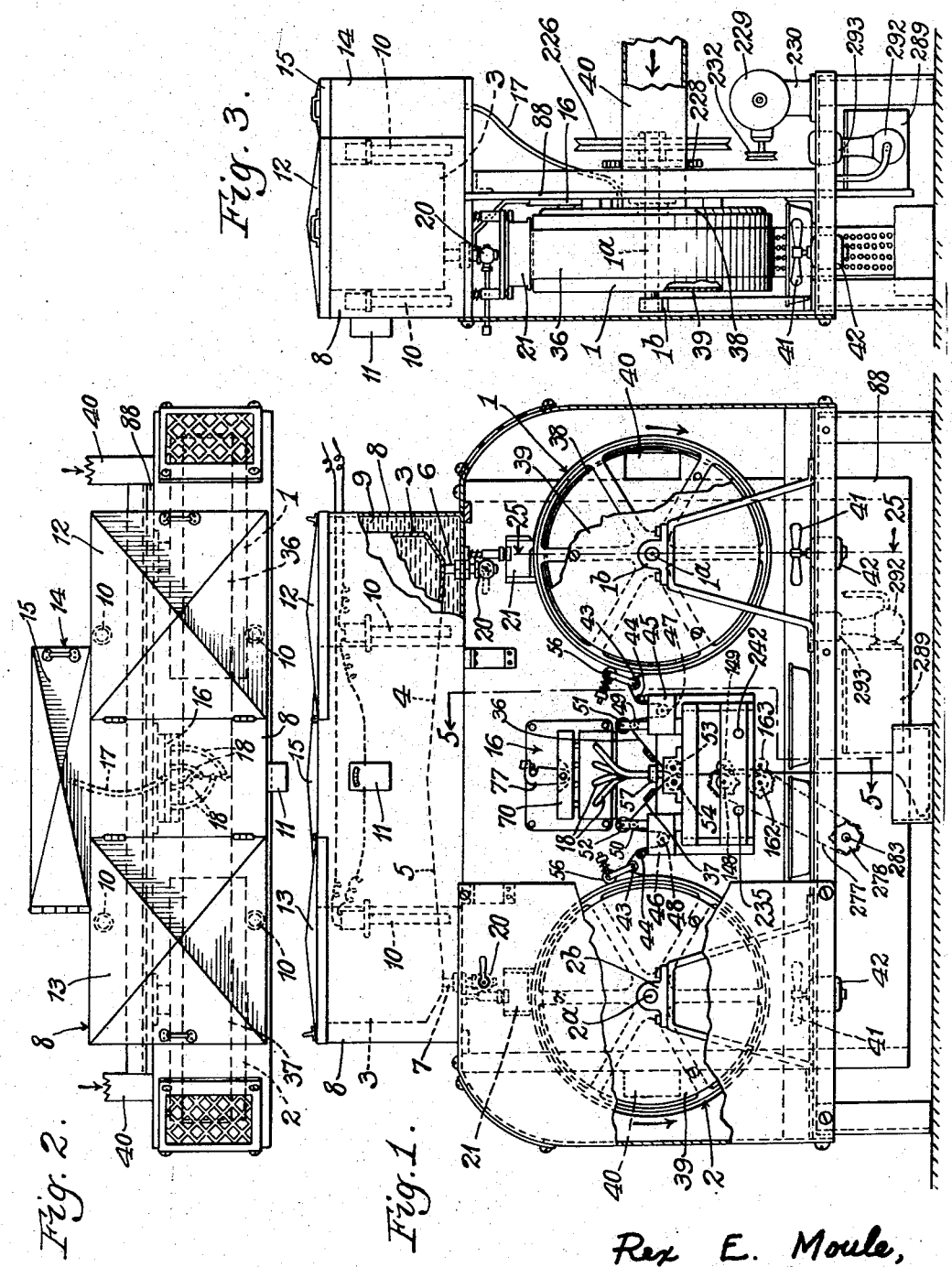

April 17, 1951 R. E. MOULE 2,549,327
CAPSULE MAKING MACHINE AND METHOD
Original Filed June 5, 1944 14 Sheets-Sheet 3

Rex E. Moule,
Inventor,
Haynes and Koenig,
Attorneys.

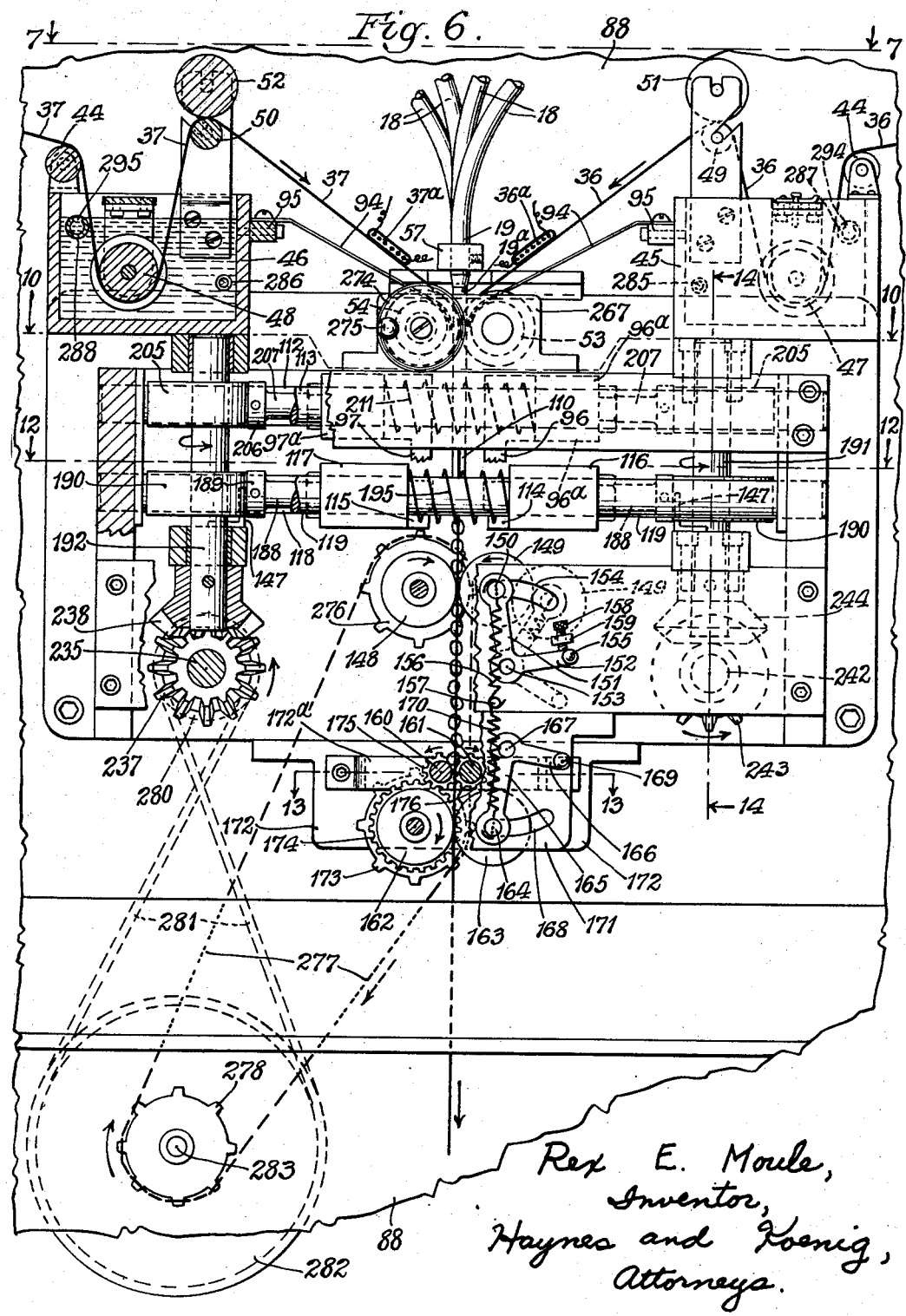

April 17, 1951 R. E. MOULE 2,549,327
CAPSULE MAKING MACHINE AND METHOD
Original Filed June 5, 1944 14 Sheets-Sheet 5
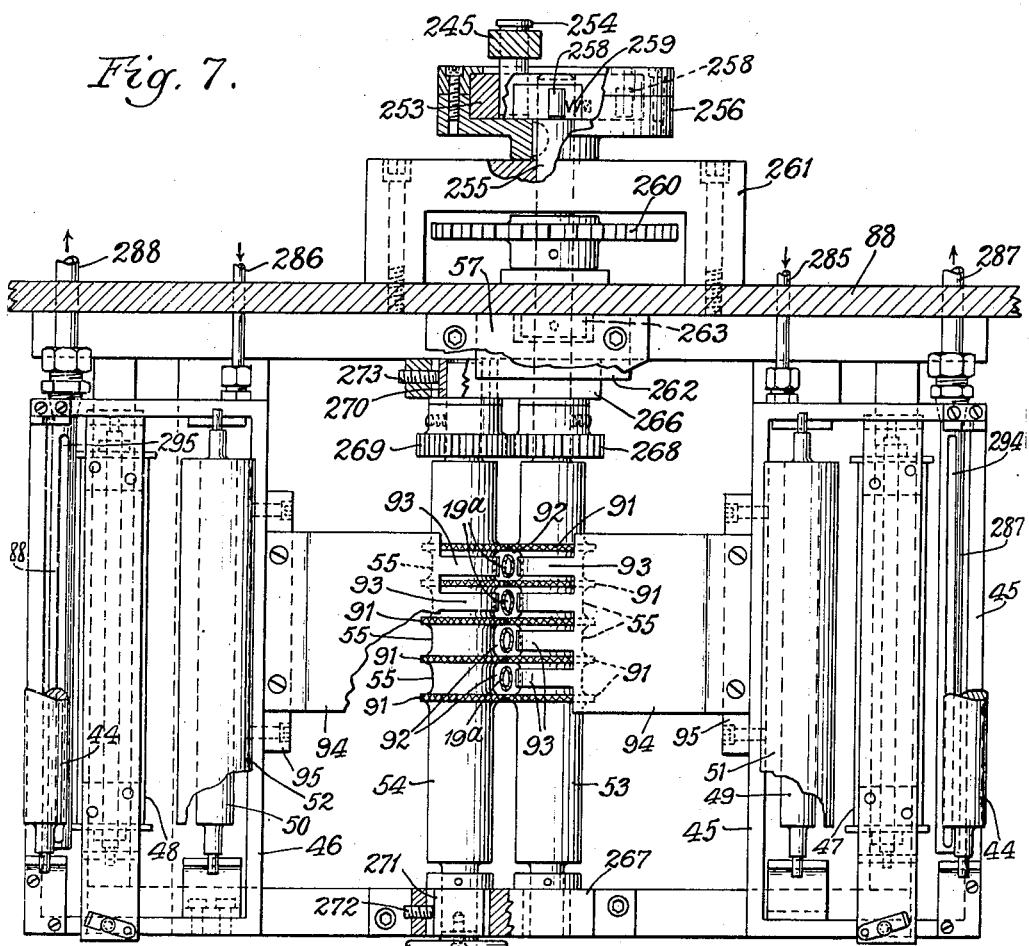
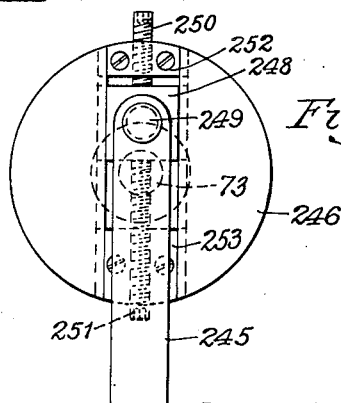
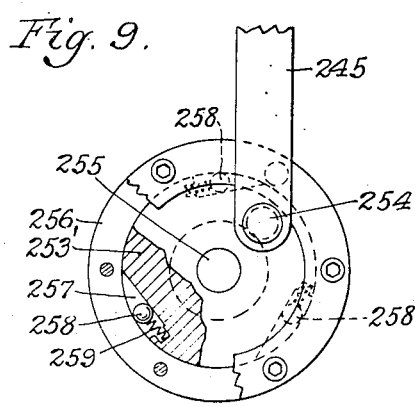
Rex E. Moule, Inventor,
Haynes and Koenig,
Attorneys.

April 17, 1951 — R. E. MOULE — 2,549,327
CAPSULE MAKING MACHINE AND METHOD
Original Filed June 5, 1944 — 14 Sheets-Sheet 6

Rex E. Moule, Inventor,
Haynes and Koenig, Attorneys.

April 17, 1951 R. E. MOULE 2,549,327
CAPSULE MAKING MACHINE AND METHOD
Original Filed June 5, 1944 14 Sheets-Sheet 7
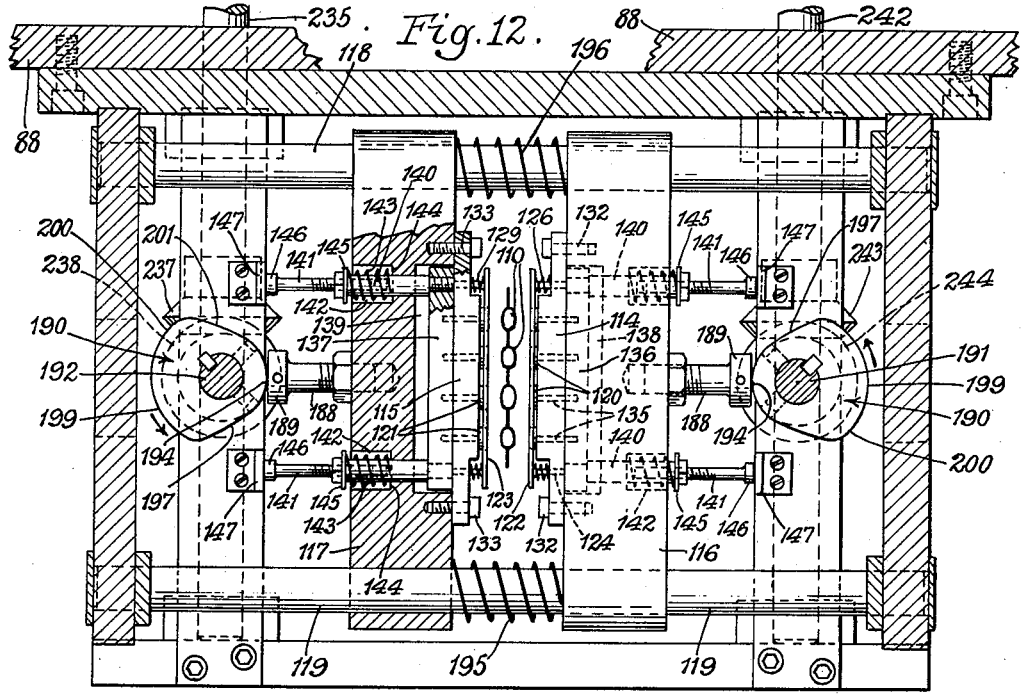
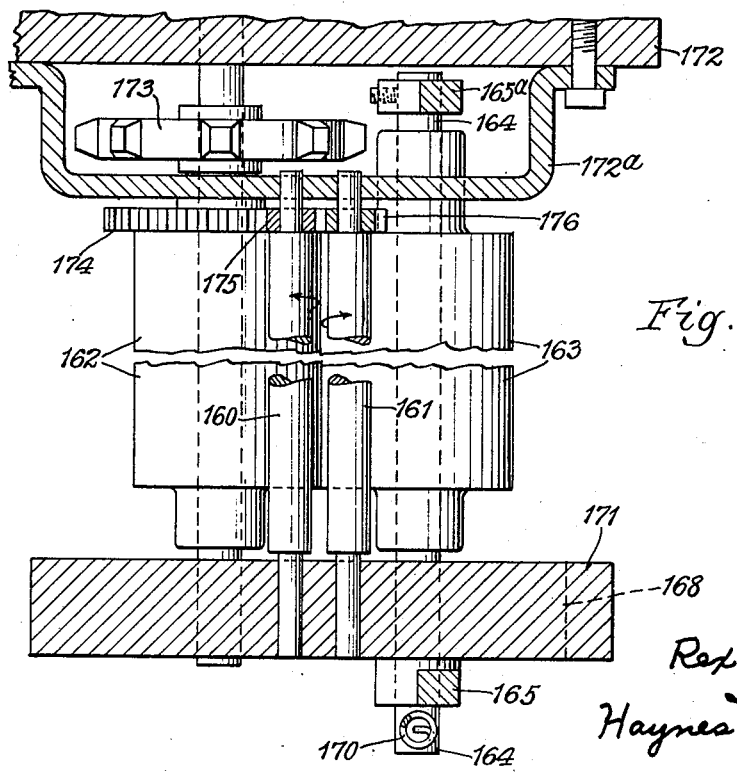
Rex E. Moule, Inventor,
Haynes and Koenig,
Attorneys.

April 17, 1951   R. E. MOULE   2,549,327
CAPSULE MAKING MACHINE AND METHOD
Original Filed June 5, 1944   14 Sheets-Sheet 8
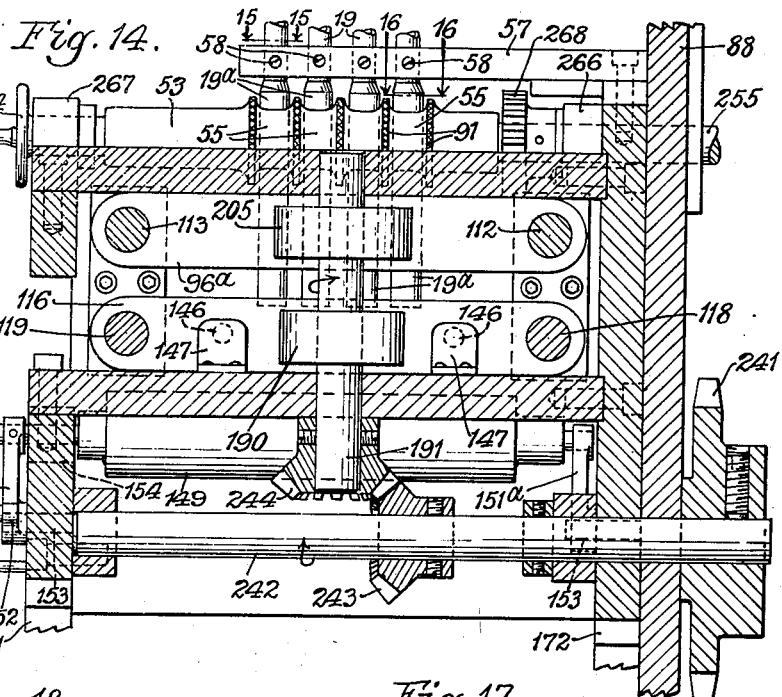
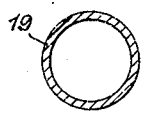
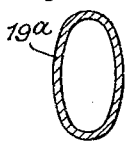
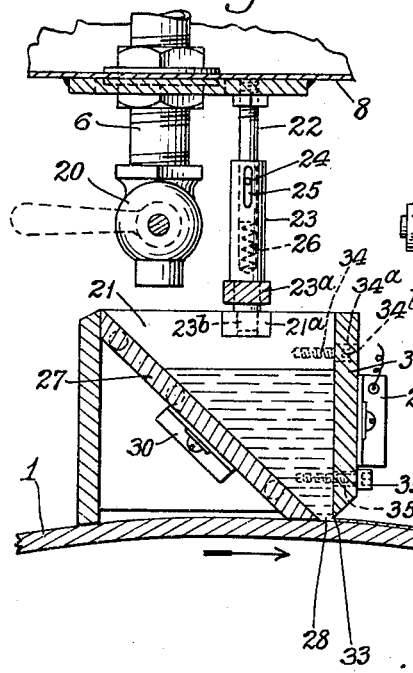
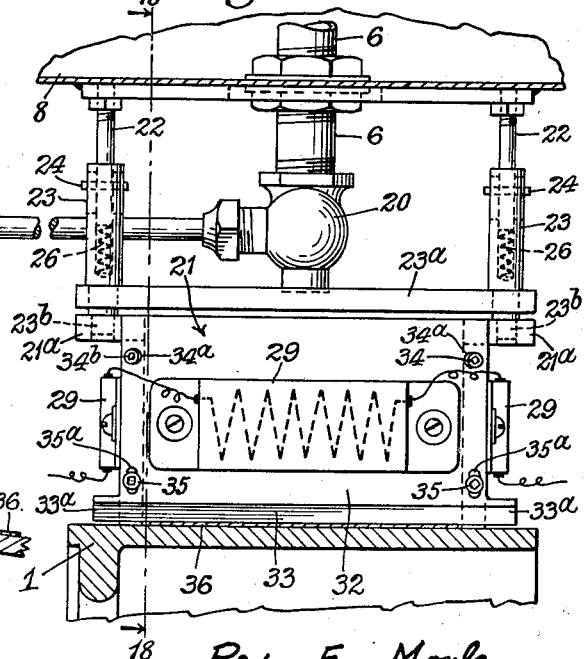
Rex E. Moule,
Inventor,
Haynes and Koenig,
Attorneys.

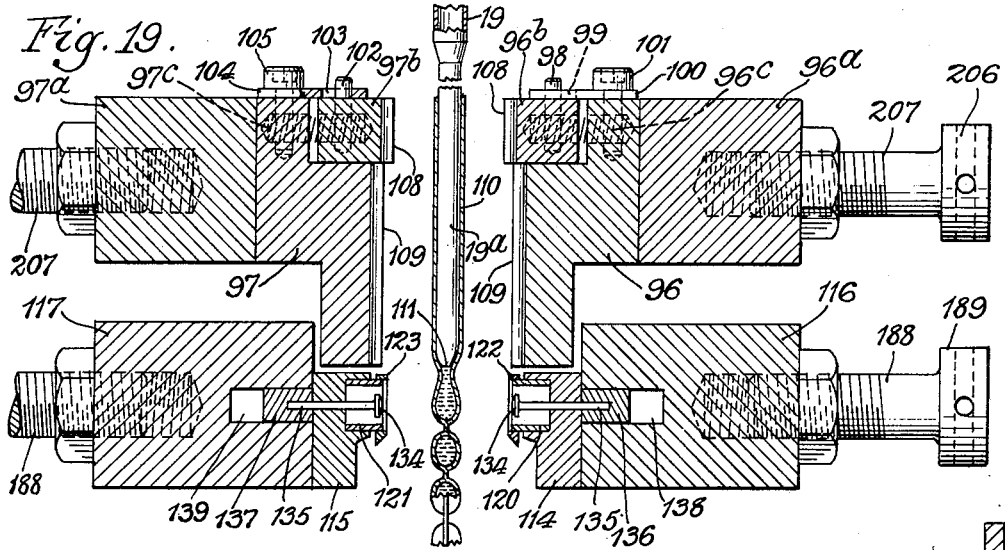
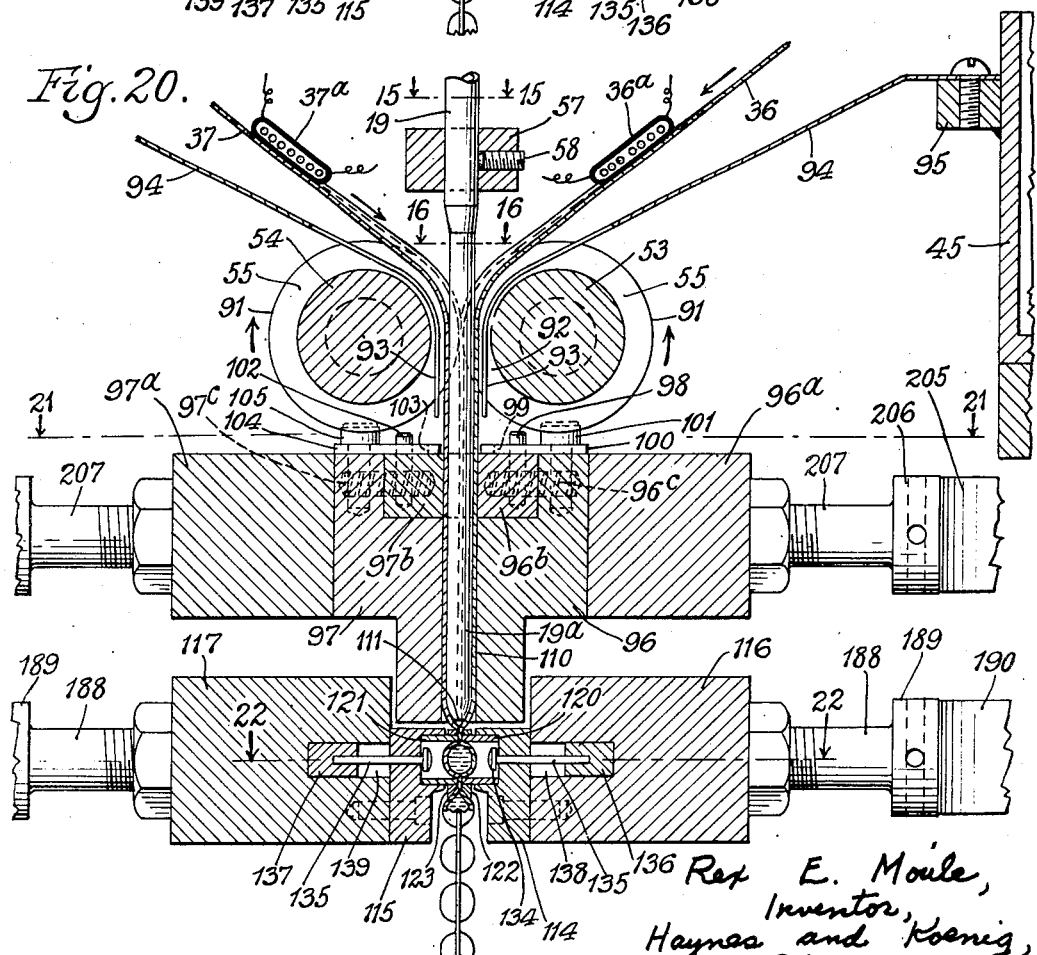

April 17, 1951     R. E. MOULE     2,549,327
CAPSULE MAKING MACHINE AND METHOD
Original Filed June 5, 1944     14 Sheets-Sheet 10

Rex E. Moule
Inventor,
Haynes and Koenig,
Attorneys.

April 17, 1951 R. E. MOULE 2,549,327
CAPSULE MAKING MACHINE AND METHOD
Original Filed June 5, 1944 14 Sheets-Sheet 11
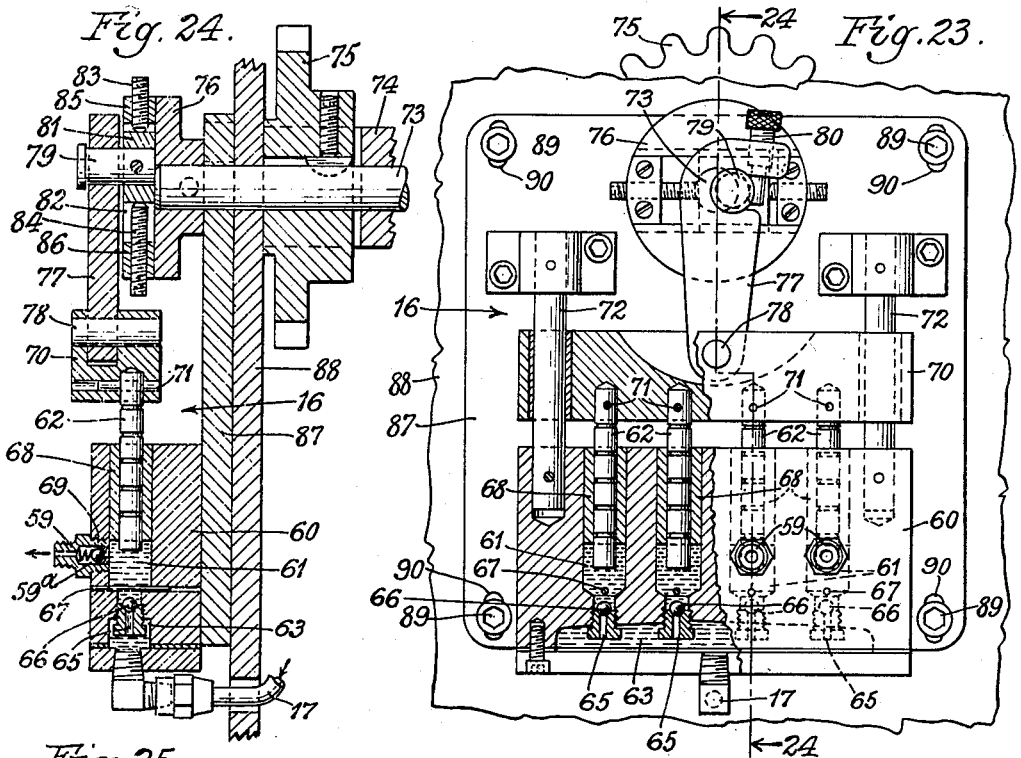

April 17, 1951           R. E. MOULE           2,549,327
CAPSULE MAKING MACHINE AND METHOD
Original Filed June 5, 1944           14 Sheets—Sheet 12

Rex E. Moule, Inventor,
Haynes and Koenig
Attorneys.

April 17, 1951 R. E. MOULE 2,549,327
CAPSULE MAKING MACHINE AND METHOD
Original Filed June 5, 1944 14 Sheets-Sheet 13
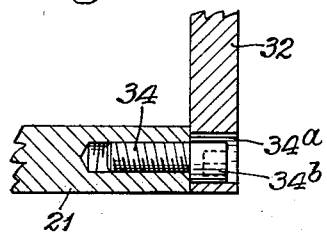
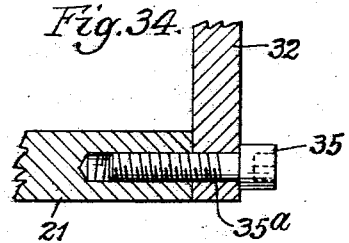
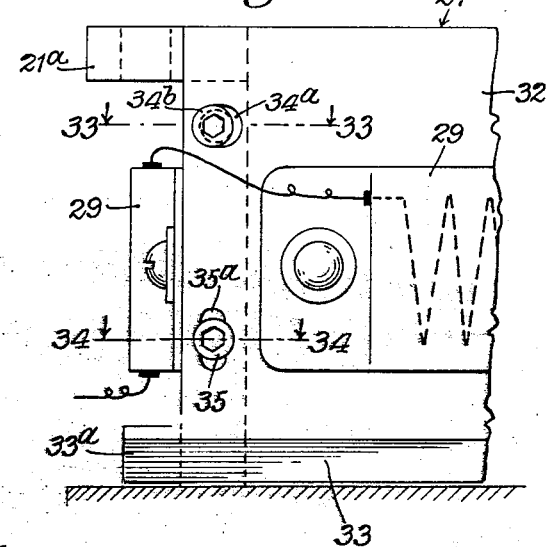
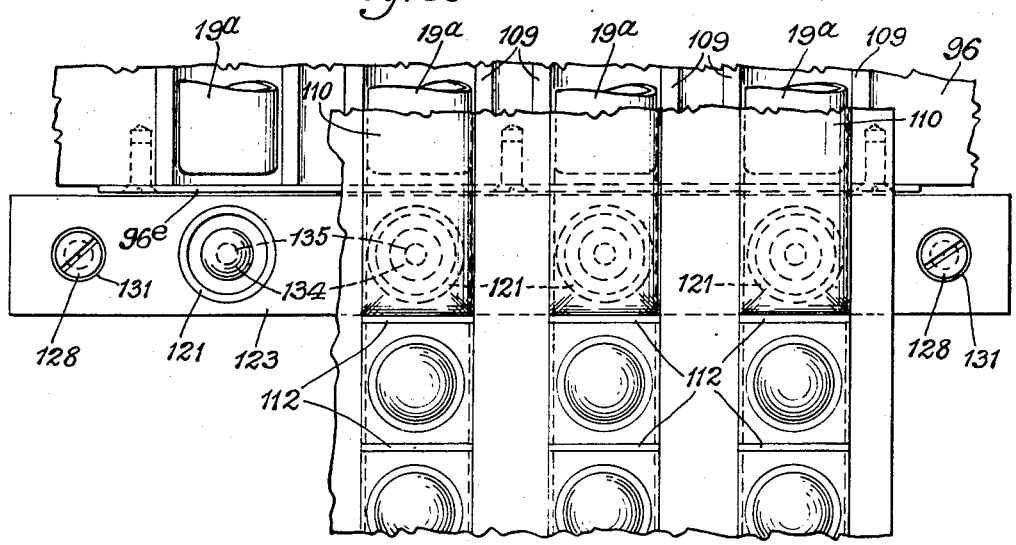
Rex E. Moule,
Inventor,
Haynes and Koenig,
Attorneys.

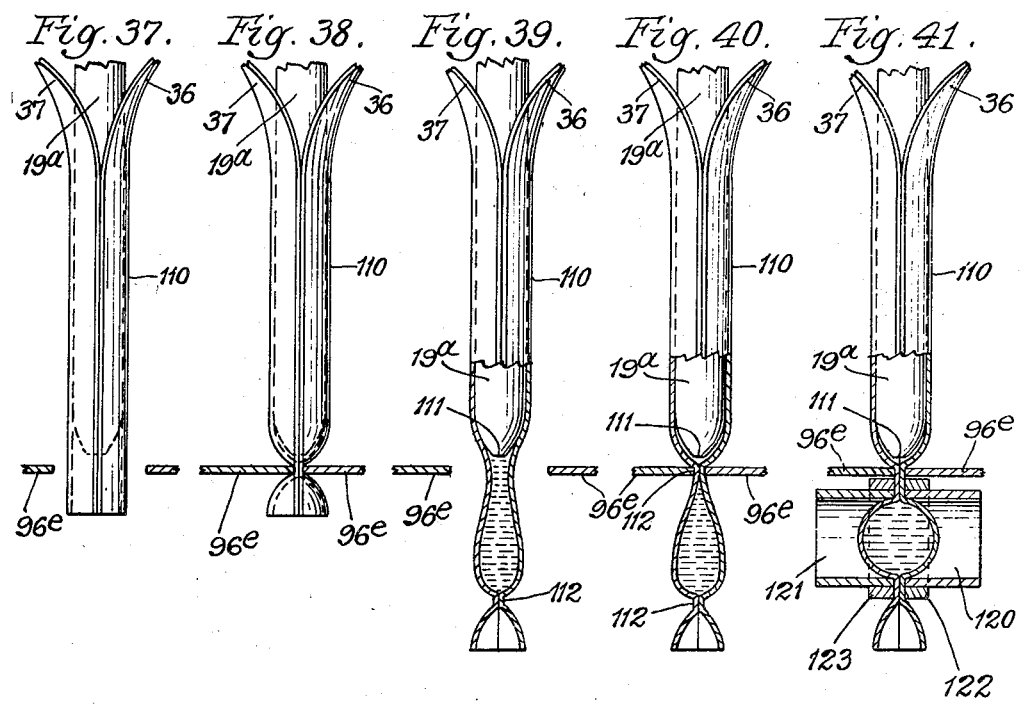
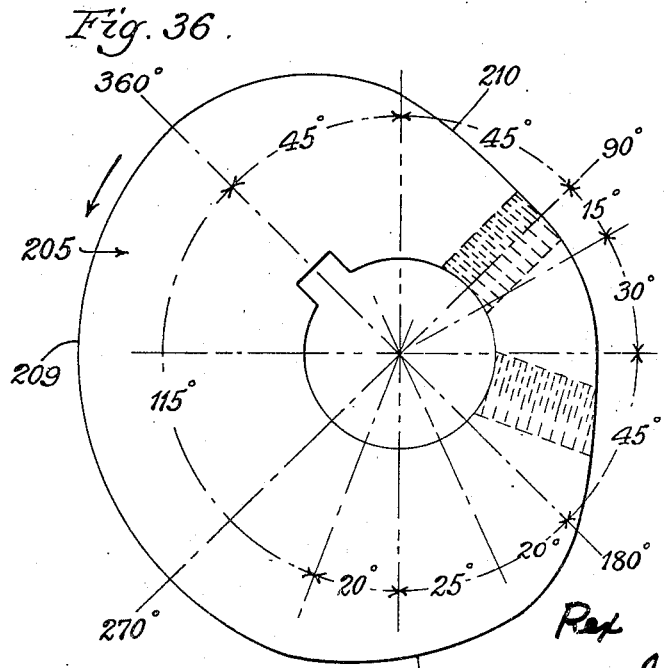

Patented Apr. 17, 1951

2,549,327

UNITED STATES PATENT OFFICE 2,549,327

CAPSULE MAKING MACHINE AND METHOD

Rex E. Moule, Worcester, Mass., assignor to Norton Company, Worcester, Mass., a corporation of Massachusetts Continuation of application Serial No. 538,761, June 5, 1944. This application September 11, 1948, Serial No. 48,912

28 Claims. (Cl. 18—5)

This application is a continuation of my copending application entitled Capsule Making Machine, Serial No. 538,761, filed June 5, 1944, now abandoned.

This invention relates to capsule making machines and methods, and more particularly to machines and methods for making capsules of the type consisting of a dose of medicament in a shell of gelatin or the like.

The principal object of the invention is the provision of an improved machine and method for the manufacture of capsules of the class described capable of economically attaining a high rate of production, avoiding production of capsules which are unsatisfactory from the standpoint of being leakers, or being weak or misshaped.

In general, according to the method of this invention, the first step is the forming of a tube of capsule-shell-forming material such as gelatin. The tube is then pinched shut transversely to form a closed transverse seam completely across the tube. A quantity of capsule filling material is introduced into the tube through an open end of the tube to provide a body of filling material confined in the tube by the seam. The tube is then pinched shut transversely at a point spaced from the first seam to form a second seam completely across the tube with the body of filling material confined in the pocket resulting between the seams. Pressure is then applied to opposite sides of the pocket over an area surrounding the central portion of the pocket to cause the filling material to bulge out the walls of the pocket to generally spheroidal shape and to pinch together portions of the walls surrounding the filling material to form a complete seam confining the filling material within a generally spheroidal shell of capsule-shell-forming material. The operation may perhaps be more clearly visualized if it is considered that the filled pocket is like a pillow, and the pressure is applied to the corners of the pillow to force filling material from the corners toward the center. This results in the bulging out of the central portion of the pillow to generally spheroidal shape. In general the machine of this invention comprises a nozzle or pipe, and apparatus for feeding a tube of capsule-shellforming material past the outlet end of the nozzle or pipe with the tube surrounding the nozzle. Beyond the end of the nozzle are elements operable upon the tube for seaming it and forming capsules in accordance with the method, the filling material being introduced into the tube through the nozzle or pipe. Other features will be in part apparent and in part pointed out hereinafter.

Referring now to the drawings:

Fig. 1 is a front elevation of one form of apparatus with parts broken out and parts in section.

Fig. 2 is a top plan view of the apparatus shown in Fig. 1.

Fig. 3 is an end view with parts broken away of the apparatus shown in Fig. 1.

Fig. 6 is a fragmentary front elevation of the apparatus with parts in section.

Fig. 7 is a sectional view taken on line 7—7 of Fig. 6, with parts omitted and parts broken away and parts in section.

Fig. 8 is a rear elevation of a crank disc for driving a clutch which feeds a gelatinous ribbon to the device.

Fig. 9 is a rear elevation of the clutch with parts in section.

Fig. 12 is a sectional view taken on line 12—12 of Fig. 6.

Fig. 13 is a sectional view taken on line 13—13 of Fig. 6.

Fig. 14 is a sectional view taken on line 14—14 of Figs. 6 and 10 with parts omitted.

Fig. 15 is a sectional view taken on line 15—15 of Figs. 14 and 20.

Fig. 16 is a sectional view taken on line 16—16 of Figs. 14 and 20.

Fig. 17 is an enlarged view of a device for controlling the flow of gelatin.

Fig. 18 is a sectional view taken on line 18—18 of Fig. 17.

Fig. 19 is a sectional view of certain dies taken on line 19—19 of Fig. 10 with the dies open.

Fig. 20 is a sectional view, similar to Fig. 19, with the dies closed and certain gelatinous ribbon feed rollers shown.

Fig. 23 is a front elevation of a medicament pump with parts in section.

Fig. 24 is a sectional view taken on line 24—24 of Fig. 23.

Fig. 25 is a sectional view taken on line 25—25 of Fig. 1.

Fig. 26 is a detail sectional view of a modified form of an upper die.

Fig. 27 is a detail view of a modified form of ribbon tensioning means which replace certain upper tension rolls.

Fig. 32 is an end elevation of an end wall 32, as shown in Fig. 17.

Fig. 33 is a horizontal sectional detail taken at line 33—33 of Fig. 32.

Fig. 34 is a horizontal detail taken at line 34—34 of Fig. 32.

Fig. 35 is a view generally similar to Fig. 30, showing a modification in certain dies and in the ribbon formed by the dies so modified.

Fig. 36 is a plan view on an enlarged scale of a cam 205, which is shown in elevation in Fig. 6.

Figs. 37 to 41, inclusive, are diagrammatic showings, with parts in section, of the formation of one of the tubes which appear in side elevation in Fig. 35. These figures are taken at right angles to the plane of the ribbon as shown in Fig. 35.

Like numerals refer to like parts throughout the several figures.

The drawings show a particular apparatus for forming the closed containers or capsules. In this apparatus gelatinous material, when in a soft, plastic condition, is formed into webs or sheets by depositing it on the flat peripheries of casting wheels as the wheels are being rotated. These sheets are delivered to nozzles or pipes and formed into tubes around these pipes.

Figure 5:
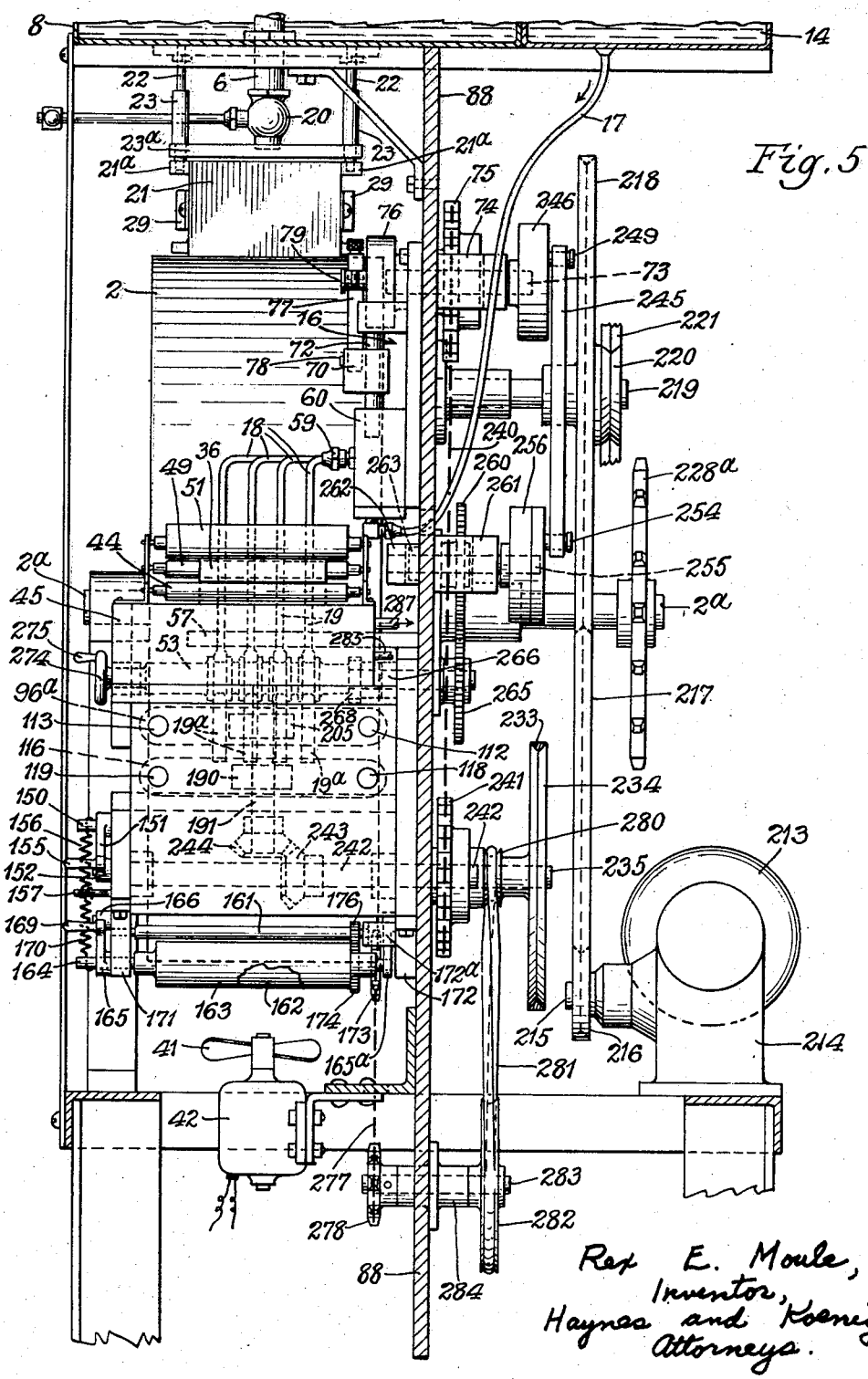
Fig. 5 is an enlarged sectional view taken on line 5—5 of Figs. 1 and 4.

Referring to the drawings, there are two spaced apart casting wheels 1 and 2, rotating in opposite directions, upon the flat peripheries of which the gelatinous material is deposited. These wheels are fastened to shafts 1a and 2a, which are rotatably mounted in bearings 1b and 2b on the supporting frame. Located above these wheels is a tank 3 which contains the gelatinous material. This tank has a bottom which has two oppositely inclined sections 4 and 5, which incline from the center downwardly toward the edge of the tank so as to insure the delivery of the gelatinous material to the outlets 6 and 7 of the tank. Some means is provided for maintaining the gelatinous material at the proper temperature to secure the proper delivery through the outlets of the tank to the peripheries of the wheels. To secure this result there is an outer tank 8 surrounding the tank 3 for the gelatinous material. There is a space between the two tanks containing a liquid 9. Some means is provided for heating this liquid. As herein shown, there are one or more electric heaters 10 in the liquid 9. The temperature of the liquid 9, and therefore the gelatinous material in tank 3, is automatically maintained at a predetermined temperature by means of a thermostat 11 supported, in the form here shown, on the outer tank 8. Admission to the tanks 3 and 8 is secured by means of doors 12 and 13 (see Figs. 1, 2 and 3). Located above the wheels 1 and 2 is a tank 14 containing the medicament or other material to be placed in the closed containers. Access to this tank is secured by means of a cover 15. A metering or measuring pump assembly 16 is provided, which is connected to the tank 14 by a pipe 17. This pump delivers measured or metered quantities of the material at each stroke through conduits 18 to pipes 19, around which the gelatinous material is formed into tubes so that each of the closed containers will contain the same amount of material. The outlets 6 and 7 of the tank 3 containing the gelatinous material are provided with valves 20, which, when open, cause the gelatinous material to be discharged into cups 21, supported in proximity to the periphery of the wheels 1 and 2. Each distributing receptacle 21, for distributing the gelatinous material to the wheels 1 and 2, rests upon the periphery of its associated wheel, and is held in place by holding devices, preferably arranged one at each side of the receptacle. Any suitable device for this purpose may be used. As herein shown (Figs. 17 and 18), these holding devices each consist of a member 22 connected to the tank 8 and a member 23 connected to the distributing receptacle 21, as shown in Figures 5 and 18. The member 22 works in the member 23 and is provided with projections 24 which work in slots 25 and in the member 23. A spring 26 tends to press the distributing receptacle 21 against the periphery of the wheel. Each distributing receptacle is provided with an inclined partition 27, which extends diagonally thereacross and has its lower end in proximity to the discharge opening 28. In order to maintain the gelatinous material at the proper temperature, the distributing receptacle is provided with one or more heating devices 29 attached to the walls thereof and a heating device 30 attached to the bottom of the inclined partition 27 (see Figs. 17 and 18). In order to secure easy access to these heating devices or for the purpose of cleaning a receptacle, a crossbar 23a can be raised, to lift the lower ends 23b of the members 23 out of socket members 21a of the receptacle 21, and the receptacle 21 can then be removed. The end wall 32 of the distributing receptacle is provided with a narrow edge 33, which may extend beyond the side walls, as at 33a. This end wall is preferably made adjustable vertically so that the thickness of the sheet of gelatinous material may be adjusted. This adjustment may be secured in any manner, as by providing one or more eccentric adjusting screws 34, each of which passes through rounded openings 34a and has an eccentric head 34b, in the end wall 32. These screws pass through these openings 34a and have threaded engagement with the side walls of the distributing receptacle. The eccentric heads 34b engage the openings to raise or lower the end wall 32. Securing screws 35 pass through vertical slots 35a and when the wall 32 has been adjusted and the screws 35 are tightened up, leakage will not occur. A gage may be inserted between the extensions 33a and the wheels 1 and 2 to obtain an accurate adjustment of the end wall 32.

As the casting wheels 1 and 2 rotate, gelatinous material, passing out of the slots 28, is deposited upon the peripheries of the two wheels 1 and 2 and forms the two sheets or webs of gelatinous material 36 and 37. Some means is provided for obtaining a proper temperature of the sheets of gelatinous material while they are on the wheels so that they will not stick to the wheels. For this purpose each wheel is provided with enclosing walls 38 and 39 (see Figs. 1, 3 and 25). The walls 38 are stationary, being mounted on a fixed support; the walls 39 are secured to the spokes of the wheels 1 and 2. Conditioned air is discharged through ducts 40 (Fig. 3) into the interior spaces formed by the peripheries of the wheels and the walls 38 and 39. Below each wheel is provided a fan or blower 41 operated by a motor 42 for dehydrating the sheets of gelatinous material on the peripheries of the wheels.

The sheets of gelatinous material 36 and 37 may have lubricant applied to them, if desired. As they leave the wheels 1 and 2, they pass rollers 43 and rollers 44 into chambers 45 and 46 which may, if desired, contain lubricant of any nature. The rollers 43 serve to remove the strips or sheets of material from the wheels 1 and 2.

If lubricant is used, it is supplied to the chambers 45 and 46 by any suitable means. One such means will be described below.

If the lubricant is used at all, it may be of any desired nature, oil, grease, water, alcohol, carbon tetrachloride or anything else which will serve the purpose of lubricating the strips or sheets 36, 37. These strips, if made of gelatinous material, will generally require lubricant. They may be made of other material, such as plastics, in which case they may require no lubricant. As the sheets or strips 36 and 37 pass through the receptacles 45 and 46, they pass, respectively, around rollers 47 and 48, which are positioned within the receptacles and which, if lubricant is present, are submerged in it. The sheets 36 and 37 then pass out of the receptacles 45 and 46 over rollers 49 and 50. Rollers 51 and 52 engage the sheets 36 and 37, their purpose being to remove surplus lubricant from the sheets, if any is present. The sheets 36 and 37 are then moved down between grooved rollers 53 and 54. These cooperating grooved rollers have a plurality of grooves 55, the number depending upon the number of tubes it is desired to form simultaneously from the sheets. Heating elements 36a and 37a may be provided for heating the sheets before they enter the grooved rollers.

Figure 28:
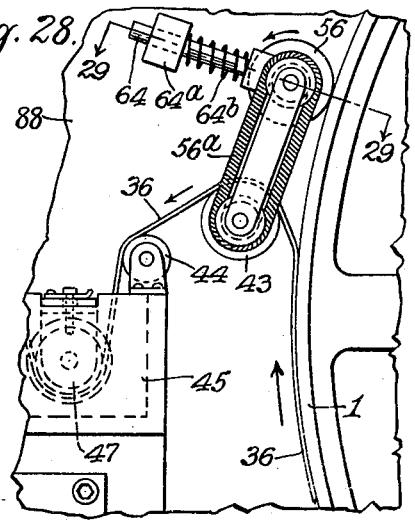
Fig. 28 is a front elevation on an enlarged scale, showing a detail of a ribbon take-off shown generally in Fig. 1.

The rollers 43 may, if desired, be driven by rollers 56 through flexible belts 56a, as shown in Fig. 28. The rollers 56 themselves are driven by frictional contact with the wheels 1 and 2. Spring or yielding means may be provided for holding the rollers 56 in contact with their respective wheels 1 and 2. For this purpose pins 64 may be used, and they support the wheels 56 and are themselves slideably mounted in members 64a. A spring 64b is positioned about each pin and is effective to hold the rollers or wheels 56 in contact with their respective wheels 1 and 2.

The pipes or nozzles 19, by means of which the filling material is conducted to the tubes from which the containers are made, are located in grooves 55 between the two rollers 53 and 54. These pipes are supported in a supporting member 57 (Fig. 20), which is located above the rollers and fastened to a fixed part on the frame. These pipes are adjustably held in position by screws 58, threaded into the support 57, so that they may be adjusted to the desired position. These pipes may be cylindrical or any other shape desired. Their upper ends are preferably cylindrical. Their lower ends 19a, which pass between the rollers 53 and 54 and down between the dies, to be hereinafter explained, are preferably non-cylindrical or flattened.

Fig. 15 illustrates, in cross section, the cylindrical portion of the pipe and Fig. 16 illustrates, in cross section, one form of the flattened or non-cylindrical part of the pipe. The cylindrical parts of the pipes are connected to the pipes 18 which are connected with the metering pump 16 by means of the couplings 59 (see Fig. 5).

One form of this metering pump is illustrated in Figs. 5, 23 and 24. This pump consists of a body portion 60, provided with a series of cylinders 61. Reciprocating in these cylinders are pistons or plungers 62. At the bottom of the body portion 60 is a chamber 63, into which the material is discharged by the pipe 17, connecting with the tank 14. The cylinders 61 have connecting passageways 65 which connect them with the chamber 63. Located in these passageways are valves 66. Pin 67 are located above these valves to prevent them from being accidentally displaced. Located in the upper parts of the cylinders 61 are interior cylinders 68, which extend only part way along cylinders 61, so as to reduce the size of the upper parts of such cylinders. The pistons 62 fit these interior cylinders 68. The lower ends of the cylinders 61 are provided with discharge openings 69 and couplings 59 containing ball check valves 59a. The couplings are connected with the pipes 18, by means of which the material to be inserted in the containers is discharged into these pipes. The pistons 62 are connected to a reciprocating member 70 in any desired manner, as by means of pins 71, and are reciprocated along the rods 72 when the pump is operated. The pump is intermittently operated by means of a shaft 73, which is mounted in a suitable bearing 74, and which is driven by a pulley or sprocket 75. Connected with the end of the shaft 73 is a disc 76. An arm 77 is pivotally connected to the reciprocating member 70 by a pin 78. This arm is connected to a short shaft 79, which is eccentrically connected with the shaft 73 (Fig. 24). As herein shown, the arm 77 has a slot at its upper end into which the short shaft 79 is received which is held against removal by a threaded member 80. The short shaft 79 is adjustable to vary the stroke of the pistons 62. This result is secured by fastening the short shaft 79 to an adjustable block 81 located in a slot 82 in the disc 76. Adjusting screws 83 and 84 are threaded into members 85 and 86 fastened to the disc 76. These adjusting screws engage opposite sides of the adjusting block 81, so that it can be moved with relation to the shaft 73 to vary the eccentric relationship between the shafts 73 and 79.

The pump cylinders are mounted upon a base 87, which is adjustably mounted upon a supporting wall 88 by fastening devices 89 passing through slots 90 in the base 87. As the pistons of the pump are reciprocated and projected into the lower ends of the cylinders, they each displace a measured quantity of the liquid, and these measured quantities are sealed in the containers. It will be noted that by adjusting the position of the short shaft 79, the stroke of the pistons may be shortened or lengthened, thereby decreasing or increasing the amount of liquid discharged at each reciprocation. For purposes of illustration, the pump is shown with four cylinders, but it is of course evident that the number of cylinders may be increased so as to increase the number of containers made at each operation of the device. The lower ends 19a of the pipes 19 project downwardly through the spaces between the rollers 53 and 54 formed by the grooves 55. There will be as many grooves 55 as there are pipes 19. At opposite sides of the grooves 55 are annular projections 91, which substantially close the ends of the spaces 92 between the rollers 53 and 54.

The sheets of material 36 and 37, after leaving the wheels 1 and 2 and passing through the lubricant baths, pass between the rollers 53 and 54, which feed the sheets and form them around the pipes connected with the pump. The annular projections 91 engage the two sheets 36 and 37 and press and seal them together so as to form closed tubes around the pipes. The rollers 53 and 54 are driven as hereinafter described.

Some means is preferably provided to prevent the sheets 36 and 37 and the tubes from sticking to the rollers 53 and 54. As herein shown, this is accomplished by means of a plurality of ribs or members 93 which project between the rollers 53 and 54 in the spaces 92 (see Figs. 7 and 20), and which are connected to the holding members 94 fastened to the supports 95. Located below the rollers 53 and 54 are the dies for forming the closed containers filled with the filling material used. The upper portions of the dies consist of opposed die members 96 and 97, which are supported upon reciprocating supports 96a and 97a. These supports, with the die members attached thereto, are moved toward and away from each other by suitable mechanism, as hereinafter described.

These die members 96 and 97 may be in a single piece, that is, integral if desired, as shown in Fig. 26. They are preferably, however, made up of two separable sections, the member 96 being provided with a section 96b and the member 97 with a section 97b. The sections 96b and 97b are movable with relation to the parts 96 and 97. The section 96b is provided with pins 98 which work in slots 99 in plates 100. These plates are fastened to the part 96 by screws 101. The section 97b is provided with pins 102, which pass through slots 103 in plates 104. These plates are fastened in position by screws 105. The die member 96 is fastened to the reciprocating support 96a by the fastening devices 106. The die member 97 is fastened to the reciprocating member 97a by fastening devices 107. The part 96b is pressed toward the pipes 19a by springs 96c so that it projects inwardly a small amount beyond the part 96. The part 97b is provided with springs 97c, which press it inwardly toward the pipes 19a a small amount farther than the die member 97. The plates 100 and 104 limit this movement. These die members have opposed engaging faces which engage the outside tube of gelatinous material surrounding the nozzles or pipes 19a.

These engaging faces are preferably divided into two parts 108 and 109, the faces 108 projecting inwardly a short distance more than the faces 109 so that they engage tubes 110 before the faces 109, so as to make a tight connection to prevent the material with which the containers are filled from being forced upwardly along the pipes 19a past that portion of the tubes, opposite which they are located.

This construction insures the proper pressure being applied to the tubes 110 to prevent leakage of the material upward along the pipes 19a. The outlet ends 111 of the pipes 19a are preferably located at the lower end of the die members 96 and 97. The reciprocating supports 96a and 97a are slidably mounted upon rods 112 and 113 (see Fig. 10).

Figures 21, 22:
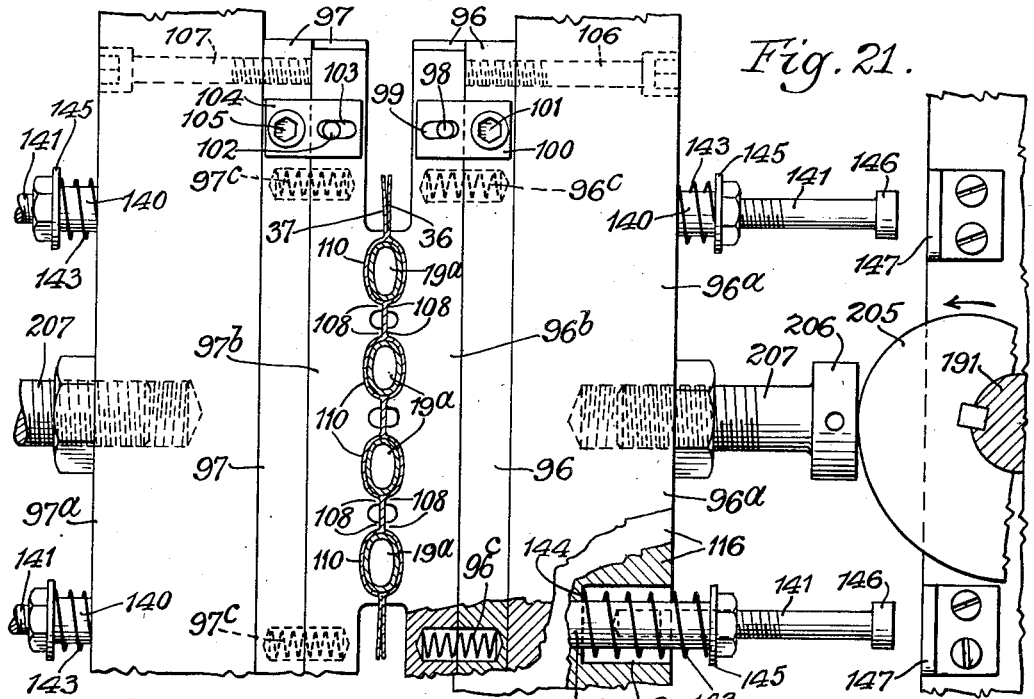
Fig. 21 is a sectional view taken on line 21—21 of Fig. 20.
Fig. 22 is a sectional view taken on line 22—22 of Fig. 20.
Figure 30:
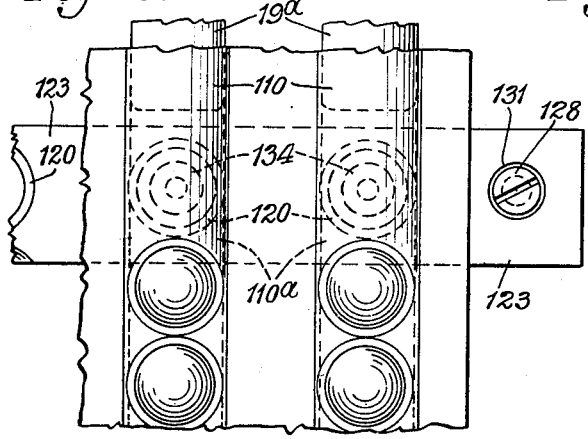
Fig. 30 is an elevational detail from the line 30—30 of Fig. 22.

Located below the die members 96 and 97 are die members 114 and 115 (Figs. 19, 20 and 21). These die members are fastened to reciprocating supports 116 and 117, which are mounted upon rods 118 and 119 and which are reciprocated by the mechanism hereinafter described, see Fig. 14.

Attached to the die member 114 are shaping and severing members 120, and there are similar and opposed shaping and severing members 121 attached to the die member 115. These die members 120 and 121 may be of any shape desired, and they are herein shown as being cylindrical in shape and hollow.

When the tubes 110 of gelatinous material are moved down below the ends 111 of the pipes 19a, the die members 114 and 115 are moved toward each other so as to cause them to engage those portions of the tubes of gelatinous material below the pipes 19a and form them into closed receptacles, sealing the edges and simultaneously severing the receptacles from the sheet of gelatinous material. When the die members 120 and 121 come together to shape and sever the containers from the sheet of gelatinous material, this sheet has a tendency to stick to the opposed edges of these die members. Some means is provided for loosening the sheet therefrom. As herein shown, there are provided stripper plates 122 and 123. These stripper plates are apertured to receive and slide on the members 120 and 121 of the dies 114 and 115, respectively. The stripper plates project slightly beyond the ends of the members 120 and 121 when the dies are open.

The plates 122 and 123 are fastened to the die members 114 and 115, respectively, by threaded pins 124 and 127, which have heads 125 and 128 countersunk into their respective plates. Springs 126 and 129 surround these threaded fastening members 124 and 127, having one end engaging the die member 114 or 115 and the other end engaging the plate 122 or 123. When the two die members 114 and 115 are moved toward each other, these stripper plates engage portions 130 of the sheet of gelatinous material and are moved back on the supporting pins 124 and 127, so as to leave a space 131 (Fig. 22) between the heads and the plates. When the die members 114 and 115 are separated, the springs 126 and 129 move the plates toward each other so as to disengage the sheet of gelatinous material from the edges of the die members 120 and 121. The further movement of the die members 114 and 115 carries the stripper plates 122 and 123 back to their initial positions. The die members 114 and 115 are attached to the supports 116 and 117 by fastening devices or bolts 132 and 133. The stripper plates 122 and 123 come together ahead of the dies so all of the filling material is forced into the space between the sheets where the capsule is to be formed and thus all of the filling material ends up in the capsule.

When the closed containers are formed and severed from the sheets of gelatinous material, they may adhere to the shaping and severing members 120 and 121 and some means is provided for releasing them so that these containers, although separated from the sheets, may move downward with the sheets to bring new portions of the tubes 110 opposite the shaping and severing members. As herein shown, this is accomplished by a plurality of releasing members, one associated with each shaping and severing member. These releasing members comprise a head 134 (Figs. 19, 20, 21 and 22), which is smaller in diameter than the interior diameter of the shaping and severing members. Each head is connected to a stem 135. These stems are slidably mounted in the die members 114 and 115 and have their ends attached to reciprocating members 136 and 137. These reciprocating members 136 and 137 are located in recesses in the reciprocating supports 116 and 117 The recesses are wider than the reciprocating members 136 and 137 by the spaces 138 and 139 (Figs. 12 and 22). Connected at each end of the reciprocating members 136 and 137 are pins 140, which are threaded into the members 136 and 137. These pins have threaded openings at their other ends into which fit threaded bolts 141. The reciprocating members 116 and 117, through which the members 140 pass, have enlarged openings 142 in which are located springs 143, the inner ends of which engage shoulders 144 and the outer ends of which engage washers 145 on the bolts 141.

These bolts have heads 146 which, when the dies are separated, are held in engagement with stops 147 on fixed cross members by the springs 143. When the reciprocating supports 116 and 117 are moved toward each other, the springs 143 maintain the heads 146 of the bolts 141 in contact with the stops 147, and hence during this first movement the reciprocating members 136 and 137, carrying the closed container releasing members, remain stationary until they reach the bottoms of the recesses in the reciprocating supports 116 and 117—that is, they remain stationary until these reciprocating supports have moved a distance equal to the width of the spaces 138 and 139. The reciprocating members 136 and 137 then move inwardly with the supports 116 and 117. By holding these parts stationary for this distance, the supporting heads 134 are held separated a sufficient amount to prevent them from engaging the closed containers (Figs. 20 and 22). When the shaping and severing members 120 and 121 reach the innermost limit of their movement so as to seal the edges of the containers and sever the containers from the sheet of gelatinous material, the parts are in position, as shown in Figs. 20 and 22, with the heads 146 of the bolts 141 at a distance from the stops 147 (Fig. 21). When the reciprocating supports 116 and 117 are moved outwardly to separate the shaping and severing members, the reciprocating members 136 and 137 move with them until the heads 146 of the bolts 141 engage the stops 147. Further movement of the reciprocating members 136 and 137 is then stopped and the opposed shaping and severing members 120 and 121 continue to move so that the heads 134 of the releasing members engage any containers that may adhere to the shaping and severing members and release them so that they are separated from the shaping and severing members, but may be held to the sheets of gelatinous material.

Located below the dies which form the closed containers are rollers 148 and 149 (Fig. 6). The roller 148 is driven. When the gelatinous material is threaded through the machine, the rollers 148 and 149 are separated to permit this to be done easily. For this purpose the roller 149 is mounted on a shaft 150 (see Figs. 6 and 14), which is connected at one end to a lever 151a and at the other end to a bell crank lever having arms 151 and 152, and which is pivoted at 153. The roller 149 is separated from the roller 148 by moving the shaft 150 along the slot 154, which is accomplished by means of a handle 155. There is a spring 156 which is fastened to the shaft 150 at one end and to a fixed part 157 at the other end. The pivot 153 is arranged so that when the roller 149 is in proximity to the roller 148, it tends to press the roller 149 toward the roller 148. When the roller 149 is moved outwardly to the position shown in dotted lines, to separate the two rollers, this spring passes on the other side of the pivot 153 and then tends to hold the roller 149 away from the roller 148. When the roller 149 is being pressed toward the roller 148, the pressure is regulated by an adjusting screw 158, which is threaded into a fixed member 159, the end engaging the arm 152 of the bell crank lever. The rollers 148 and 149 engage the closed containers and the sheets, tending to pull them downwardly and keep the gelatinous material between the rollers 53 and 54 in a taut condition.

They further engage the closed containers after they have been formed, and if any of these closed containers are weak, the pressure of the rollers ruptures the weak ones so that they will be separated from the good, strong containers. It is important that no weak containers be packed in a bottle or other receptacle, inasmuch as they may break, their contents leak out, and thereby spoil many of the good ones in the bottle.

Located below the rollers 148 and 149 are discharge rollers 160 and 161. These rollers are slightly out of contact with each other, but the space between them is insufficient to allow a container to pass downwardly between them. The containers are engaged by these rollers and discharged from the sheets which have been formed and drop down into a suitable receptacle. Both of these rollers are driven. The rollers 160 and 161 may have knurled or otherwise roughened faces.

Located below the rollers 160 and 161 are the tension rollers 162 and 163 which engage the gelatinous material after the containers have been removed therefrom and apply tension to it so as to pull it down. The roller 163 is mounted upon a shaft 164 connected to a bell crank lever having arms 165 and 166 pivoted at 167. The roller 163 may be separated from the roller 162 by moving the shaft 164 along a slot 168. This is done by means of a handle 169. A spring 170 tends to hold the roller 163 in contact with the roller 162.

The tension roller 162 is rotatably mounted in members 171 and 172. The member 171 serves additionally to support one end of the discharge rollers 160 and 161. The other ends of these rollers are supported in a bracket 172a (see Figs. 5 and 6). The shaft 164 of the roller 163 is rotatably suspended in an arm 165 at one end and an arm 165a at the opposite end, and the member 171 has the slot 168 so the roller 163 can be moved away from the roller 162. The roller 162 is driven by a sprocket wheel 173 and is provided with a gear 174 which drives the discharge rollers 160 and 161 by means of pinions 175 and 176 (see Figs. 6 and 13).

Instead of having the rollers 148 and 149 for tensioning the sheet of gelatinous material and detecting the imperfect containers, there may be provided rollers 177, 177a, 178 and 179, which are staggered (see Fig. 27) so that the sheet is bent out of alignment. Some means is provided for adjusting this tension. As herein shown, this result is secured by mounting the rollers 178 and 179 on an adjustable member 180 by connecting the adjustable member to a member 181 of a bell crank lever which is pivoted at 182. The other member 183 of this bell crank lever is provided with a handle 184 by which it is moved. The adjustable member 180 is connected to the bell crank lever by a connecting member 185, which moves in a slot 186 to secure the adjustment. There is a spring 187 which applies tension to the bell crank lever and the adjustable member 180.

Figure 10:
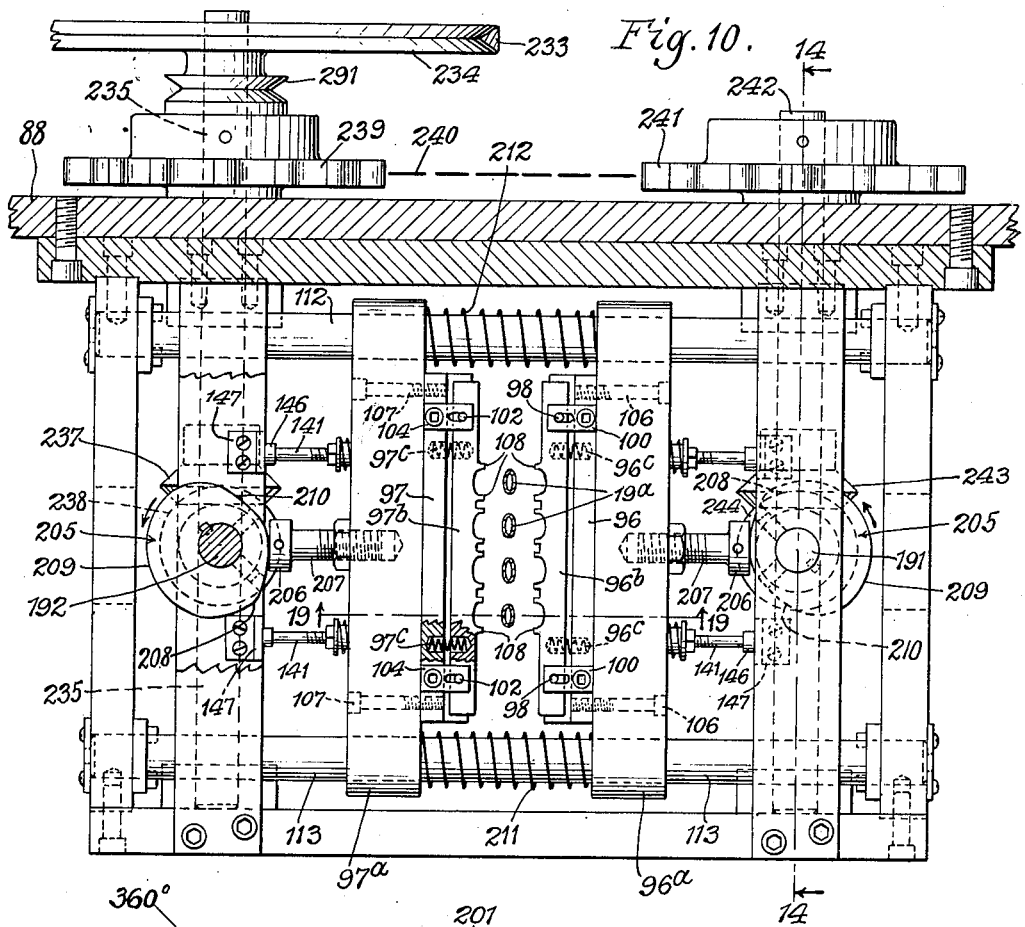
Fig. 10 is a sectional view taken on line 10—10 of Fig. 6.
Figure 11:
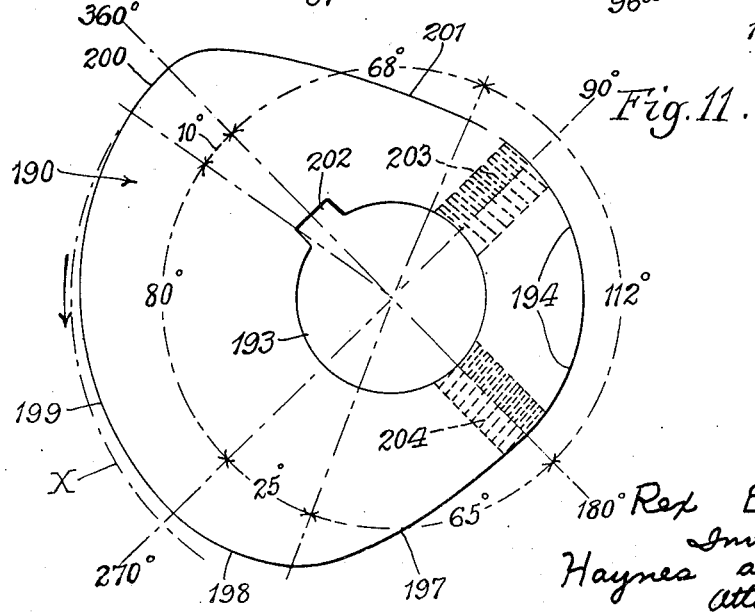
Fig. 11 is an enlarged plan view of a bottom cam for actuating a container-shaping device.

In moving the die members toward each other to engage the gelatinous material and form the closed containers, some means is provided for moving the die members toward each other at a very slow speed during the last part of their movement as they are coming together in order to prevent the gelatinous material from being injured, as is likely to result from a rapid movement of these dies near the end of their closing movement. As herein shown, this result is secured by the following means:

The reciprocating supports 116 and 117 which are mounted upon the rods 118 and 119 are each provided with a projecting adjustable member 188, preferably provided with an enlarged head 189 (Figs. 10, 11 and 12). Each of these adjustable members is engaged by a cam 190. Since the parts for moving the reciprocating supporting members 116 and 117 are similar, I have described one in detail and given the same reference numerals to them. These cams are mounted upon shafts 191 and 192, which are driven, as hereinafter described, at the same speed. An enlarged view of the cams 190 illustrating the details of their construction is shown in Fig. 11, which shows the cam separated from the shaft and is a diagrammatic view showing the various cam surfaces and how they act. The cams have openings 193 for the shaft 191 or 192.

When the die members are fully open, the cam face 194 is engaging the head 189 of the member 188 attached to the reciprocating supports 116 and 117. The reciprocating supports 116 and 117 are moved in one direction by the cams and in the other direction by springs 195 and 196 when the pressure of the cams is released. The cams are moved in the direction of the arrows. The cam face 197, by means of which the container-forming dies are moved during the early part of their movement toward each other, increases its distance from the center of the opening 193 of the cam at a comparatively high rate so as to move the container-forming dies rapidly toward each other. The cam face 198 departs at a lesser rate from the center of the opening 193 so as to slow down the movement of the container-forming dies. The cam face 199 increases its distance from the center of the opening 193 of the cam at a very much slower rate so as to greatly slow down the movement of the container-forming dies toward each other during the latter part of their movement. The cam face 200 is at the maximum distance from the center of the opening 193 and holds the dies closed during this interval. The dot-dash line is a true arc drawn about the center of rotation of the cam 190.

The reason for the slowing down of the movement of the container-forming dies during the latter part of their movement is in order to avoid the formation of leaky capsules. The container-forming dies can be moved away from their final closed position at a much greater speed because there is little danger of injury to the capsules during this movement.

In order to bring out this feature more clearly, I have shown by a broken line the periphery of a circle with its center at the center of the opening 193. I have indicated the cam face 194 as extending through 112°, the cam face 197 as extending through 65°, the cam face 198 as extending through 25°, the cam face 199 as extending through 80°, the cam face 200 as extending through 10°, and the cam face 201 as extending through 68°. This showing is simply made for purposes of illustration of one form of cam that has given complete satisfaction. It is, of course, evident that the length of these cam faces and the speed with which they depart from the center of the opening 193 can be greatly varied. The important factor is that during the latter part of the movement of the container-forming cams toward their closed position, this movement should be very slow so as not to injure the material from which the containers are formed, while the movement of the container-forming cams, after the containers have been formed, away from their closed position, should be rapid. The cams are connected to the shafts in any desired manner. As herein shown, they are connected by keys in key slots 202 and by set screws in threaded holes 203 and 204.

The cams 205, which move the reciprocating supports 96a and 97a, carrying the die members 96 and 97 which engage the two sheets of gelatinous material and form them into a tube around the pipe 19a, are of a different shape, as these dies do not have the same conditions to meet. The die members 96 and 97 should be closed earlier than the die members 114 and 115 so as to form the tube and press it tightly around the pipe 19a before the shaping and severing members of the die members 114 and 115 apply pressure to that portion of the tube which projects beyond the end of the pipe 19a, for otherwise these shaping and severing members would press the material in the projecting end of the tube upwardly so that a full container might not be secured.

The two cams for these upper dies are similar, and I have described one and applied the same numerals to both of them. In Fig. 10 the parts are shown with the dies in their open position and the faces of the cams engaging heads 206 of members 207 which are attached to the reciprocating supports 96a and 97a. The cams 205 rotate in the direction of the arrows. The first movement of each cam is very rapid so that when the cam face 208 has passed the head 206, the die members 96 and 97 are completely closed. The cam face 209 is an arc of a circle with its center at the center of the opening of the cam so as to hold tightly the die members 96 and 97 in their closed positions. The portion of the face 210 rapidly approaches the center of the opening in the cam so as to open quickly the die members 96 and 97. The reciprocating supports 96a and 97a, with the die members connected thereto and which reciprocate on the rods 112 and 113, are moved away from each other by springs 211 and 212 on the rods 112 and 113.

The various shafts and parts may be driven in any desired manner. In the construction shown, for example, in Fig. 4, there are two motors. The motor 213 is provided with speed-changing gears in a housing 214, which gears drive a shaft 215. This shaft is provided with a pulley 216, which may be a sprocket wheel. Passing around this pulley is a belt 217 which passes over a wheel 218 so as to drive it. On the shaft 219 of this wheel is a pulley 220. A belt 221 passes over this pulley and over a pulley 222 so as to drive it.

Figure 4:
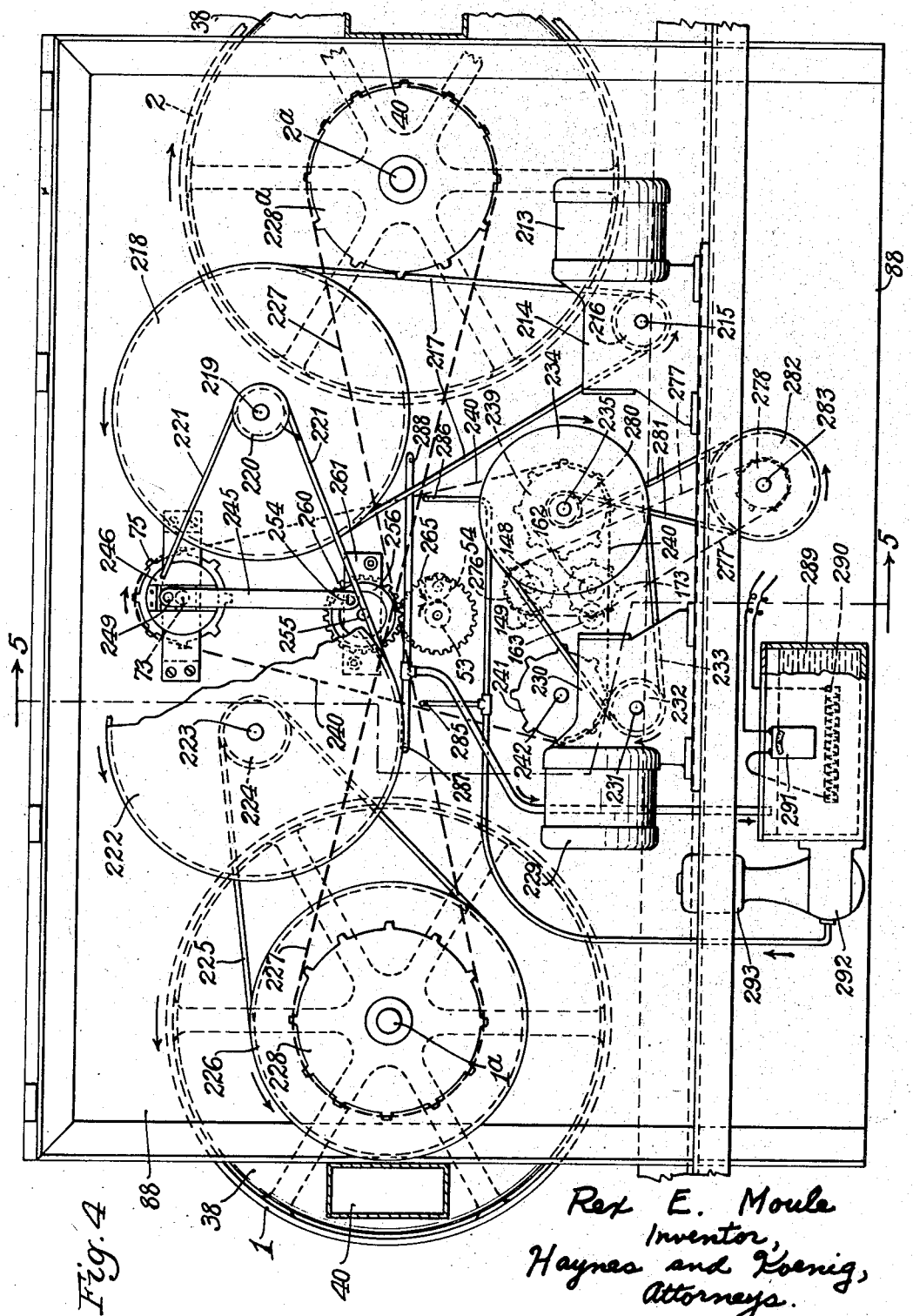
Fig. 4 is an enlarged rear view of the apparatus shown in Fig. 1, showing a drive mechanism.

The pulley 222 has a shaft 223 provided with a pulley 224. A belt 225 passes over this pulley and passes over a pulley 226 on the shaft of the large wheel 1, upon which one of the sheets of gelatinous material is delivered. This drives the wheel 1. A belt or chain 227 passes over a sprocket 228 on the shaft 1a of the wheel 1 and over a sprocket 228a attached to the shaft 2a of the wheel 2 so as to drive it. This belt is crossed so that the wheel 2 is driven in the opposite direction from the wheel 1. There is a second motor 229 provided with reducing gears in a housing 230 connected to a driving shaft 231 provided with a pulley 232. A belt 233 passes over this pulley and over a pulley 234 on a shaft 235. The shaft 235 projects through the wall 88 (Fig. 10) and is provided with a bevel gear 237 (Fig. 6) which engages a bevel gear 238 on the shaft 192, on which are mounted the cams 190 and 205. The shaft 235 is provided with a sprocket 239 (Figs. 4, 5 and 10). A chain 240 passes around this sprocket and the sprocket 75 on the pump shaft 73 (Fig. 24) and around a sprocket 241 on a shaft 242. This shaft is provided with a bevel gear 243 (Figs. 6 and 14), which engages a bevel gear 244 on the shaft 191, to which are connected the cams 190 and 205. The cams, therefore, are driven by the second motor 229 and the shaft 235.

The motor 229 also drives the rollers 53 and 54 through the shaft 235 and the belt 240 which actuates the pulley 75. These rollers 53 and 54 are moved intermittently so that when the sheets of gelatinous material from which the containers are made have been joined to form the tube and a portion thereof moved to project beyond the end of the pipe 19a, the movement is stopped until the container-forming dies are moved in to form the container with the material therein. To secure this result an intermittently actuated clutch is used. Connected with the pulley 75 which drives this clutch is an arm 245, which is eccentrically connected to a disc 246 mounted on the shaft 73 to which the pulley 75 is fastened. The arm 245 is connected to a block 248 (Fig. 8), which slides in a groove in the disc 246. The arm 245 is connected by a pin 249 with this block. The block is adjustable to vary the eccentricity of the connection of the arm 245 with relation to the shaft 73. This adjustment is made by means of adjusting screws 250 and 251, which pass through fixed parts 252 and 253. Loosening one of these screws and tightening the other moves the block 248, as desired. The arm 245 is connected to a movable clutch member 253' (Fig. 9) by a pin 254. The clutch member 253 is mounted on a shaft 255.

Surrounding the clutch member 253 is a clutch member 256, which is rotated intermittently in the same direction. The clutch member 253 is provided with a plurality of recesses 257, decreasing in size from one end toward the other, each containing a movable member, or ball, 258 with a spring 259 pressing it toward the narrow part of the recess. The distance between the shaft 73 and the pin 249 is less than the distance between the shaft 255 and the pin 254, so that as the disc 246 is rotated, the arm 245 is reciprocated.

During the movement of the arm 245 in one direction, the balls 258 are pressed into the narrow parts of the recesses 257, so that the clutch member 256 is given a partial rotation. When the arm 245 is moved in the opposite direction, the clutch member 253 is moved back to its original position, while the clutch member 256 remains stationary. The clutch member 253 is loose on the shaft 255. The clutch member 256 is fastened to the shaft 255 so as to rotate it intermittently and in the same direction. There is a gear 260 pinned to the shaft 255. This shaft is mounted in a bearing at one end in a supporting member 261 and in a bearing 262 at the other end. Endwise movement of the shaft 255 is prevented by a collar 263 and the hub of the gear 260.

Located below the gear 260 on the shaft 255, and meshing with it, is a gear 265 (Fig. 4). The gear 265 is connected with the roller 53 (Figs. 5 and 7), mounted in bearings 266 and 267. The roller 54 is driven by the roller 53 by means of gears 268 and 269. The roller 54 is mounted in bearings 270 and 271, which are adjustable toward the roller 53 by means of adjusting screws 272 and 273, so that the two rollers 53 and 54 may be relatively adjusted to the proper relative positions. These two rollers may be rotated by hand to thread the sheets of material therethrough, or for any other purpose, by means of a crank 274 provided with a handle 275.

The roller 148 is driven by a sprocket 276 by means of a belt 277 which passes over a sprocket 278 on a shaft 283. This belt 277 also engages and drives the sprocket 173 connected with the tension roller 162, and this tension roller, by means of the gear 174, engaging the pinion 175, drives the discharge roller 160 (see Figs. 6 and 13). The pinion 175 on this discharge roller engages the pinion 176 on the discharge roller 161, so that both of these discharge rollers are driven and in opposite directions, one roller moving clockwise and the other counter-clockwise, so as to discharge the filled containers from the sheet from which they are made.

A pulley 280 on the shaft 235 engages a belt 281 which drives a pulley 282, mounted on the shaft 283. The shaft 283 is mounted in a bearing 284 in the wall support 88.

Lubricant of any nature is supplied to the chambers 45 and 46 by pipes 285 and 286, respectively. Overflow is prevented by pipes 287 and 288, respectively, communicating with the chambers 45 and 46, respectively, which pipes are provided with slots or perforations 294 and 295, respectively. The lubricant is contained in a receptacle 289 positioned generally at the bottom of the mechanism, as shown in Figs. 1 and 3. If necessary, heating means may be provided for heating the contents of the chamber or receptacle 289. This means is shown in Fig. 4 diagrammatically as a heating coil 290 electrically heated, and it may be provided with thermostatic controlling means 291 positioned to be responsive to the temperature of the fluid within the receptacle 289.

A pump 292 is adapted to withdraw fluid from the receptacle 289 and to convey it to the pipes 285 and 286. A motor 293 is positioned to drive the pump 292. The electrical circuits and controls for the pumps are not shown, as their details form no essential part of the invention.

Figure 31:
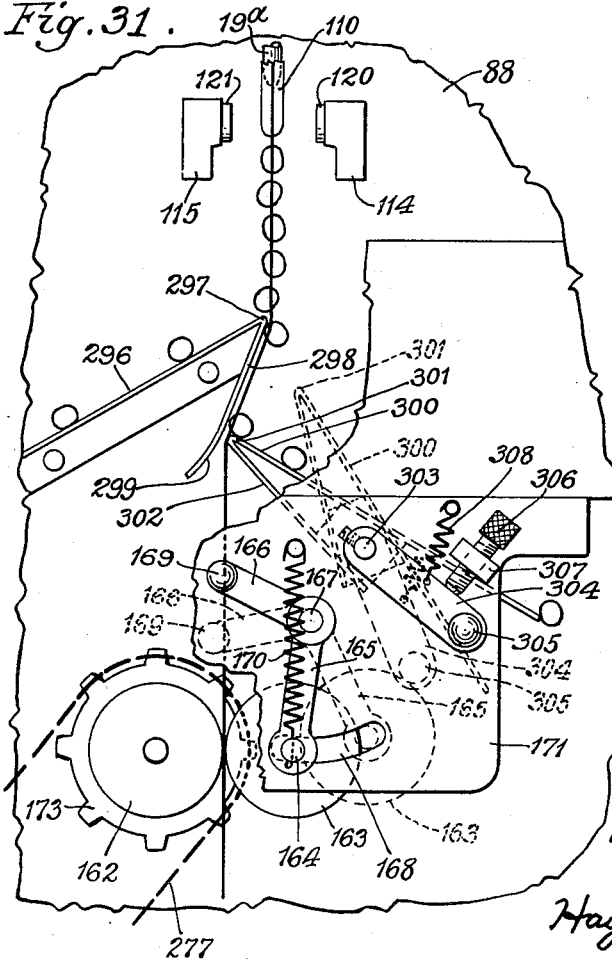
Fig. 31 is a front elevation of a further modification of the ribbon-tensioning and capsule knock-out mechanism.
Figure 29:
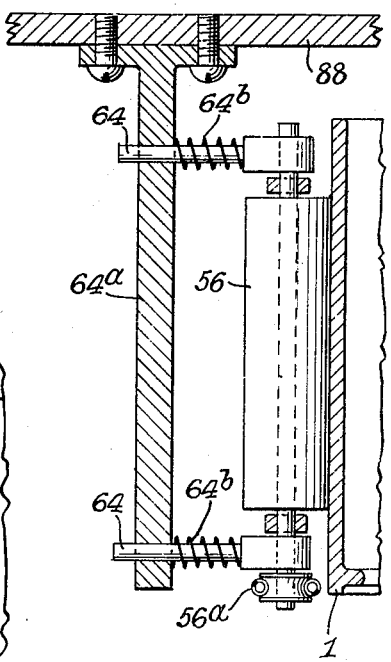
Fig. 29 is a transverse sectional detail taken at line 29—29 of Fig. 28.

In Fig. 31 there is shown a modified ribbon-tensioning device and capsule knock-out means. The lower portion of this form of the device is in part the same as that shown in Fig. 6, but instead of the knock-out rollers 160 and 161, a fixed abutment 296 is provided. This has a nose portion 297 which extends into the path of the descending capsules and deflects the ribbon. It is provided also with a downwardly inclined, reversely directed portion 298 which terminates at its lower end in a curved portion 299.

Positioned to cooperate with the member 298 is a second abutment formed of members 300 and 302, which join at a nose portion 301. The members 300 and 302 are secured to a shaft 303 which is carried in suitable bearings in the plate 171, or otherwise. Fixed to the shaft 303 is an adjusting arm 304 which may be provided with a handle or knob 305. An adjusting screw 306 is threaded into a member 307 which is fixed to the flat portion 171. The member 306 bears at one end against the arm or lever 304. A spring 308 is secured at one end to the member 304 and tends to raise it and to hold it against the adjusting member 306, thus tending, when free to do so, to rotate the abutment formed of the members 300 and 302 in a counter-clockwise direction.

It will be noticed that the nose 300 is laterally offset with respect to the nose 297 and the two noses cooperate to cause the ribbon as it moves past them to make two changes of direction, and thus to insure displacement of the capsules by one nose or the other. The upper surfaces of the two abutments direct the capsules away from the ribbon and to some receptacle.

It has been stated above that portions of the form of the mechanism shown in Fig. 31 are the same as the corresponding members shown in Fig. 6. They differ, however, in that the handle 166, as shown in Fig. 31, is to the left of the shaft 167, while in the form of Fig. 6 it is to the right of that shaft. This arrangement is necessary so that the handle may clear the lever 304 of Fig. 31. Except for this change, the positioning and operation of the parts just discussed are identical in the two figures.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

In general, the use and operation comprise the steps of, first, forming a plurality of ribbons of gelatin or analogous material; second, bringing the ribbons together and forming one or more tubes; third, closing the bottom of the tube or tubes; fourth, depositing a quantity—preferably a measured quantity—of material in the bottom of the tube or tubes so formed; fifth, forming a capsule by closing the tube or tubes above the bottom closure; and sixth, removing the completed capsules with their contents within them from the remaining ribbon of flat material.

In the particular form here shown, the gelatin or analogous material is contained in the tank 3 and is deposited through the members 21 onto the wheels 1 and 2. The thickness of the ribbons of material to be formed may be controlled by the size or width of the opening beneath the member 32. It is also preferable to control the temperature and relative moisture of the air within which the wheels 1 and 2 are contained in order to control the formation of the ribbons, the consistency and the relative dryness of the ribbons.

As the ribbons pass about the wheels 1 and 2, they are removed over the rollers 43 and may be, if desired, passed through lubricant chambers. A lubricant of any desired nature and temperature may be contained in the chambers. The excess of lubricant may be removed, if desired, and the ribbons then pass to the members 19, 19a and between the rollers 53 and 54, which are shown in Figs. 7 and 20. The rollers produce approximately the condition shown in Fig. 21, in which the two ribbons 36 and 37 of gelatin or other material have been brought together and initially formed into one or more tubes 110. The composite ribbon now passes downwardly through the system, partly under the influence of the wheels 53 and 54, which continue to feed more ribbon, and partly under the influence of the members 162 and 163 shown in Figs. 6, 27 and 31, which pull downwardly on the composite ribbon. As the composite ribbon with the tubes 110 moves downwardly from the rollers 53 and 54, it comes between the die members 109.

It will be noticed that in the form shown in Figs. 19 and 20 the die members 109 have spring-held portions 108 which, when free to do so, extend forward of them. Thus when the die parts 96 and 97 which carry the die members 109 are moved toward each other to form the tubes 110, the portions 108 first contact the ribbon and first form the upper portion of the tube and hold it in place, and shortly thereafter the main die portions 109 contact the ribbon to complete the formation of the tube. In the modified form of Fig. 26 the advanced or leading portion 108 may be made integrally with the die portion 109.

The die portions 96 and 97 are driven forward, respectively, by the members 96a and 97a which, through the members 207, are reciprocated by cams 205, shown in plan view in Fig. 36.

Below the die members 96 and 97, which with the die portions 109 may be considered as tube-forming dies, are positioned capsule-forming dies. These dies are carried by the members 116 and 117, which through portions 188 are driven by cams 190, shown in plan in Fig. 11.

As shown in Figs. 6 and 20, there are two cams 205 and two cams 190. These cams are situated to the right and left of Fig. 6 and are, in effect, paired together. Thus a cam 190 and a cam 205 are positioned upon the shaft 192, while a cam 190 and a cam 205 are positioned on the shaft 191. These cams thus rotate together and at the same speed, but the shape of the cams is such that the parts driven by the cams 190 follow the parts driven by the cams 205. Since the tube-forming dies are driven by the cams 205, they advance somewhat ahead of the capsule-forming dies driven by the cams 190. This is necessary to insure that the tubes are completely formed before the capsule-forming dies are actuated to form capsules from the previously formed tubes. This operation and the relative speeds and movements of the die assemblies will be clear from a comparison of the cam profiles as shown in Figs. 11 and 36.

In the form of Figs. 19 and 20 the capsule-forming dies include members 114 and 115 which are fastened, respectively, to the portions 116 and 117. Each of the capsule-forming dies includes a tubular member 120 or 121 mounted, respectively, in the parts 114 and 115. In addition, there is positioned in each of the capsule-forming die assemblies a member 136 or 137, in each of which is fixed a plurality of knock-out pins 135, there being one knock-out pin for each of the capsule-forming dies 120 and 121. When the die carriers 116 and 117 recede—that is to say, when they move, respectively, to the right and left from the position of Fig. 22—the knock-out pins 135 are caused to move relative to the dies 120 and 121 and thus prevent any of the capsules from sticking in the capsule-forming dies.

Each of the capsule-forming die assemblies is provided with a stripper plate 122 or 123. These stripper plates are movably mounted on pins 124 or 127 and are biased in the forward direction by springs 126 and 129. When the dies move together, the stripper plates are moved slightly away from contact with the beveled heads 125 and 128 of the pins 124 and 127. When the dies move apart, the springs carry the stripper plates into contact with the beveled heads just mentioned to serve to free the ribbon with the capsules now formed in it from contact with the capsule-forming dies.

In the modified form of Fig. 26 a forming plate 96e is fastened to each of the members 96 and 97. When this modified form is used, the plates 96e seal the ribbons together horizontally so as to form sealed enclosures for the filling material prior to the action of the stripper plates 122 and 123 or of the dies 120 and 121. Thus, when the stripper plates and dies come together they act upon what are virtually sealed pillows of gelatin containing filling material.

After the ribbon with the capsules formed in it has moved below the capsule-forming die assemblies, it comes into contact with one or another of the capsule knock-out means which are shown in one form in Fig. 6 and in a second form in Fig. 27 and in a third form in Fig. 31. The forms of Figs. 6 and 27 are generally similar to each other and include members 160 and 161. These members are spaced adjacent to each other, although slightly apart, and are preferably rotated, and their surfaces may be knurled. The space between them is not sufficient for the passage of a capsule, and the result is that as the ribbon with the formed capsules still in it moves downwardly, the capsules are ejected by the members 160 and 161. The form of Fig. 27 differs from that of Fig. 6 by the provision of a plurality of members 177, 177a, 178 and 179. It will be noticed in Fig. 27 that these members are out of line with the normal downward path of the ribbon, with the result that as the ribbon moves about them it is bent and caused to change its direction, and this will normally have an ejecting effect, so that many, at least, of the capsules will be dislodged from the ribbon before they reach the members 160 and 161, but those which remain will be ejected by the members 160 and 161.

In the further modification of Fig. 31 the die assembly is illustrated only diagrammatically and a pair of fixed members is mounted ahead of the rollers 162 and 163, which are the rollers serving to drive or draw the ribbon downwardly. These members include the parts 296, 297, 298 and 299 and the parts 300, 301 and 302. They are normally stationary, although one of them is adjustable as to position, and they serve to cause the ribbon to change its direction twice, and with this change of direction some bending of the ribbon occurs and the capsules will be ejected where bending occurs. Some will be discharged over the surface 296 and others over the surface 300 and will be directed to a suitable container or storage means.

After all of the capsules have been removed or ejected from the ribbon, the ribbon may be disposed of or may be melted and used again in the formation of another ribbon.

The diagrammatic showing of the formation of the tube and capsules which appears in Figs. 37 to 41, inclusive, is illustrated with the plates 96e in position. Even if these plates are omitted, the dies 120 and 121 with the stripper plates 122 and 123 will be effective to form the capsules. The plates 96e, however, assist in forming a more perfect and more perfectly centered and shaped capsule. In general, as shown in Fig. 38, the plates 96e come together and pinch the tube transversely, thus forming a first transverse seam 112 completely across the tube. The plates 96e are then retracted, the tube fed downward, and a dose of medicament introduced into the tube through the nozzle 19a, as illustrated in Fig. 39. Plates 96e then come together again and pinch the tube, forming a second transverse seam 112, with the dose confined in the pocket resulting between the two seams 112, as illustrated in Fig. 40. Then, as the dies 120 and 121 come together, the stripper plates 122 and 123 apply pressure to opposite sides of the pocket over an area surrounding the central portion of the pocket to cause the medicament to bulge out the walls of the pocket to generally spheroidal shape, and, subsequently, the ends of the dies pinch together portions of the walls of the pockets surrounding the dose of medicament to form a complete seam confining the dose within a generally spheroidal shell of gelatin (Fig. 41). The advantage of using the plates 96e which form the portions 112, as shown in Fig. 35, is that it prevents a misplacement of the capsule body and prevents the medicament from finding its way into a non-central location. It is also to be noticed that the stripper plates come together slightly before the dies 120 and 121 and thus squeeze or direct or force the medicament into the capsule, so that there is no waste or displacement.

I claim:

1. An apparatus for making filled closed containers comprising two rotatable rollers provided with a plurality of grooves extending therearound and having annular projections which define the edges of said grooves, pipes extending between said rollers through said grooves, means for delivering two separated sheets of flexible material into the space between said rollers and in close contact with said pipes, said annular projections pressing the two sheets of flexible material together between said pipes, opposed dies below said rollers through which said pipes extend and which engage the flexible material around said pipes and form it into tubes, and a second set of dies below the ends of said pipes comprising opposed hollow tubular members, the edges of which, when the dies are brought together, engage the flexible material to form it into sealed closed containers.

2. An apparatus for making filled closed containers comprising two rotatable rollers provided with a plurality of grooves extending therearound and having annular projections which define the edges of said grooves, pipes extending between said rollers through said grooves, means for delivering two separated sheets of flexible material into the space between said rollers and in contact with said pipes, said annular projections pressing the two sheets of flexible material together between said pipes, opposed dies below said rollers through which said pipes extend and which engage the flexible material around said pipes and form it into tubes, and a second set of dies below the ends of said pipes comprising opposed hollow tubular members, the edges of which, when the dies are brought together, engage the flexible material to form it into sealed closed containers, the edges of said second set of dies engaging the flexible material in proximity to the ends of said pipes to stamp out capsules from said containers.

3. The method of making capsules comprising the steps of forming a tube of flexible capsule-shell-forming sheet material, pinching shut the tube transversely to form a first closed transverse seam completely across the tube, introducing a quantity of capsule filling material into the tube through an open end thereof to provide a body of filling material confined in the tube by said seam, pinching shut the tube transversely at a point spaced from said first seam to form a second seam completely across the tube with said body of filling material confined in the pocket resulting between said seams, and subsequently applying pressure to opposite sides of the pocket over an area surrounding the central portion of the pocket to cause the filling material to bulge out the walls of the pocket to generally spheroidal shape and to pinch together portions of the walls surrounding the filling material to form a complete seam confining said filling material within a generally spheroidal shell of capsule-shell-forming material.

4. The method of making capsules comprising the steps of forming a plurality of tubes of flexible capsule-shell-forming material from a pair of webs of such material by forming transversely spaced longitudinal seams joining the webs in face-to-face relation at said seams, pinching shut the webs transversely to form a first transverse seam closing all the tubes, introducing a quantity of capsule filling material into each tube through an open end thereof to provide a body of filling material confined in each tube by said seam, pinching shut the webs transversely at a point spaced from said first seam to form a second transverse seam closing all the tubes with the respective bodies of filling material confined in the pockets resulting between said seams of their respective tubes, and subsequently applying pressure to opposite sides of each pocket over an area surrounding the central portion of each pocket to cause the filling material to bulge out the walls of each pocket to generally spheroidal shape and to pinch together portions of the webs surrounding the bodies of filling material to form complete seams confining said bodies of filling material within generally spheroidal shells of capsule-shell-forming material.

5. A capsule making machine comprising a nozzle, apparatus for feeding a tube of capsule-shell-forming material past the outlet end of the nozzle with the tube surrounding the nozzle, tube-seaming elements operable to form a transverse seam across the tube beyond the end of the nozzle, mechanism for delivering a dose of capsule filling material through the nozzle into the tube during the interval between successive tube-seaming operations of said elements so as to confine each dose in a pocket between adjacent transverse seams, and capsule-forming elements engageable with opposite sides of the pocket adapted to confine the dose within a localized, bulged-out, substantially central zone of the pocket and to pinch together opposite walls of the tube to form a seam confining the dose within a generally spheroidal shell of capsule-shell-forming material.

6. A capsule making machine comprising a nozzle, apparatus for forming a tube of flexible capsule-shell-forming material around the nozzle and for feeding the tube past its outlet end, a pair of dies movable toward and away from the nozzle on opposite sides of the latter formed to pinch and close the tube beyond the end of the nozzle, mechanism operating in timed relation to said dies for periodically delivering a dose of capsule filling material through the nozzle into the tube during the interval between the tube-pinching operations of the dies so as to confine each dose in a pocket between the seams formed by the dies, and a pair of capsule-forming dies movable toward and away from the tube on opposite sides of the latter beyond the first-mentioned pair of dies engageable with opposite sides of the pocket to confine the dose within a localized, bulged-out, substantially central zone of the pocket and to pinch together opposite walls of the tube to form a seam confining the dose within a generally spheroidal shell of capsule-shell-forming material.

7. A capsule making machine comprising a set of parallel, spaced-apart nozzles, apparatus for forming tubes of flexible capsule-shell-forming material, one around each nozzle, and for feeding the tubes past the outlet ends of the nozzles, a pair of dies movable toward and away from the nozzles on opposite sides of the latter and formed to pinch and close all the tubes beyond the ends of the nozzles, mechanism operating in timed relation to the dies for periodically delivering doses of capsule filling material through the nozzles into the respective tubes during the interval between the tube-pinching operations of the dies so as to confine each dose in a pocket in its respective tube between the seams formed by the dies, and a pair of capsule-forming dies movable toward and away from the tubes on opposite sides of the latter beyond the first-mentioned pair of dies engageable with opposite sides of the pockets to confine each dose within a localized, bulged-out, substantially central zone of its pocket and to pinch together opposite walls of the tubes to form seams confining each dose within a generally spheroidal shell of capsule-shell-forming material.

8. A capsule making machine comprising a nozzle, web feeding apparatus for feeding a pair of webs of flexible capsule-shell-forming material on opposite sides of the nozzle past its outlet end and including seaming elements engageable with the webs for longitudinally seaming them to form a tube surrounding the nozzle, a pair of reciprocating dies movable toward and away from the nozzle on opposite sides of the latter formed to compress the tube against the nozzle and to pinch and close the tube beyond the end of the nozzle, mechanism operating in timed relation to the dies for periodically delivering a dose of capsule filling material through the nozzle into the tube during the interval between the tube-pinching operations of the dies so as to confine each dose in a pocket between adjacent transverse seams formed by the dies, and a pair of capsule-forming dies reciprocating toward and away from the tube on opposite sides of the latter beyond the first-mentioned pair of dies and including open-ended tubular die elements, the ends of which are engageable with opposite sides of the pocket to confine the dose within a localized, bulged-out substantially central zone of the pocket and to pinch together opposite walls of the tube to form a seam confining the dose within a generally spheroidal shell of capsule-shell-forming material.

9. A capsule making machine as set forth in claim 8, including mechanism for reciprocating the two pairs of dies in such phase relationship that the tube-compressing dies compress the tube against the nozzle before the capsule-forming dies come into engagement with opposite sides of the pocket for forming a capsule.

10. A capsule making machine as set forth in claim 8, wherein said capsule-forming dies are reciprocated by mechanism adapted to move them toward the tube initially at relatively high speed and ultimately at low speed as they approach their closed position engaging opposite sides of the pocket.

11. A capsule making machine as set forth in claim 8, wherein each capsule-forming die includes a stripper plate surrounding the tubular die element and having an outer pocket-engaging face, said plate being slidable on the tubular die element between a pocket-compressing position wherein its outer face is forward of the pinching end of the tubular die element and a retracted position clear of said pinching end, said plates being normally maintained in their pocket-compressing position and movable relatively to the tubular die elements to their retracted positions upon engagement with opposite sides of the pocket as the capsule-forming dies move toward one another.

12. A capsule making machine comprising a nozzle, apparatus for feeding a tube of capsule-shell-forming material past the outlet end of the nozzle with the tube surrounding the nozzle, a first pair of dies movable toward and away from the nozzle on opposite sides of the latter formed to compress the tube against the nozzle, mechanism for delivering a dose of capsule filling material through the nozzle into the tube, and a second pair of dies movable toward and away from the tube on opposite sides of the latter beyond the first pair of dies formed to pinch together opposite walls of the tube around a dose to form a seam confining the dose within a generally spheroidal shell of a capsule-shell-forming material.

13. A capsule making machine comprising a nozzle, apparatus for forming and feeding a tube of capsule-shell-forming material past the outlet end of the nozzle with the tube surrounding the nozzle, a first pair of dies reciprocable toward and away from nozzle on opposite sides of the latter formed to compress the tube against the nozzle, mechanism for periodically delivering a dose of capsule filling material through the nozzle into the tube, and a second pair of dies reciprocable toward and away from the tube on opposite sides of the latter beyond the first pair of dies formed to pinch together opposite walls of the tube around a dose to form a seam confining the dose within a generally spheroidal shell of capsule-shell-forming material, the dose-delivering mechanism being timed to deliver a dose between successvie capsule-forming operations of the second pair of dies.

14. A capsule making machine as set forth in claim 13 wherein the apparatus for forming and feeding the tube comprises a pair of peripherally grooved feed rolls on opposite sides of the nozzle, the latter extending between the rolls through the grooves therein, the rolls being adapted to feed a pair of webs of flexible capsule-shell-forming material on opposite sides of the nozzle and longitudinally to seam the webs to form a tube surrounding the nozzle.

15. A capsule making machine as set forth in claim 13 wherein the dies of said first pair are formed to exert more pressure on a portion of the tube spaced from the outlet end of the nozzle than on the length of the tube extending from said portion to the outlet end of the nozzle.

16. A capsule making machine as set forth in claim 13 including mechanism for reciprocating the two pairs of dies in such phase relationship that the dies of the first pair compress the tube against the nozzle before the dies of the second pair pinch together the opposite walls of the tube.

17. A capsule making machine as set forth in claim 13, wherein the dies of the second pair are reciprocated by mechanism adapted to move them toward the tube initially at relatively high speed and ultimately at low speed as they approach their closed position engaging opposite sides of the tube.

18. A capsule making machine comprising a nozzle, web feeding apparatus for feeding a pair of webs of flexible capsule-shell-forming material on opposite sides of the nozzle past its outlet end and including seaming elements engageable with the webs for longitudinally seaming them to form a tube surrounding the nozzle, a pair of dies movable toward and away from the nozzle on opposite sides of the latter formed to compress the tube against the nozzle, mechanism operating in timed relation to the dies for periodically delivering a dose of capsule filling material through the nozzle into the tube, and a pair of capsule-forming dies movable toward and away from the tube on opposite sides of the latter beyond the first-mentioned pair of dies and including open-ended tubular die elements the ends of which are engageable with opposite sides of the tube to pinch together opposite walls of the tube to form a seam confining the dose within a generally spheroidal shell of capsule-shell-forming material.

19. A capsule making machine comprising a set of parallel, spaced-apart nozzles, apparatus for forming tubes of flexible capsule-shell-forming material, one around each nozzle, and for feeding the tubes past the outlet ends of the nozzles, a pair of reciprocating dies movable toward and away from the nozzles on opposite sides of the latter formed to compress the tubes against the nozzles, mechanism operating in timed relation to the dies for periodically delivering doses of capsule filling material through the nozzles into the respective tubes, and a pair of capsule-forming dies reciprocable toward and away from the tubes on opposite sides of the latter beyond the first-mentioned pair of dies and including open-ended tubular die elements the ends of which are engageable with opposite sides of the tubes to pinch together opposite walls of the tubes to form seams confining each dose within a generally spheroidal shell of capsule-shell-forming material.

20. A capsule making machine as set forth in claim 19, wherein each capsule-forming die includes a stripper plate surrounding its tubular die elements and having an outer tube-engaging face, said plate being slidable on the tubular die elements between a tube-compressing position wherein its outer face is forward of the pinching ends of the tubular die elements, said plates being normally maintained in their tube-compressing position and movable relatively to the tubular die elements to their retracted positions upon engagement with opposite sides of the tube as the capsule-forming dies move toward one another.

21. A capsule forming machine comprising a pipe, apparatus for forming a tube of flexible capsule-shell-forming material around the pipe and for feeding the tube past an outlet end of the pipe, a pair of reciprocating dies movable toward and away from the pipe on opposite sides of the latter formed to pinch and close the tube beyond the outlet end of the pipe, mechanism operating in timed relation to the dies for periodically delivering a dose of capsule filling material through the pipe into the tube during the interval between the tube-pinching operations of the dies so as to confine each dose in a pocket between adjacent transverse seams formed by the dies, a pair of reciprocable tubular open-ended die elements movable toward and away from the tube on opposite sides of the latter beyond the first mentioned pair of dies, the open ends of the tubular die elements being engageable with opposite sides of a pocket and adapted to pinch together the opposite walls of the tube to form a seam, and pocket-squeezing members surrounding the tubular die elements each having an outer pocket-engaging face, each of said members being slidable on its respective tubular die element between a pocket-compressing position wherein its outer face is forward of the pinching end of the tubular die element and a retracted position clear of said pinching end, said members being normally maintained in their pocket-compressing position and movable relatively to the tubular die elements to their retracted positions upon engagement with opposite sides of the pocket as the die elements move toward one another.

22. A capsule forming machine comprising a pipe, apparatus for forming a tube of flexible capsule-shell-forming material around the pipe and for feeding the tube past an outlet end of the pipe, a pair of reciprocating dies movable toward and away from the pipe on opposite sides of the latter formed to pinch and close the tube beyond the outlet end of the pipe, mechanism operating in timed relation to the dies for periodically delivering a dose of capsule filling material through the pipe into the tube during the interval between the tube-pinching operations of the dies so as to confine each dose in a pocket between adjacent transverse seams formed by the dies, a pair of reciprocable tubular open-ended die elements movable toward and away from the tube on opposite sides of the latter beyond the first mentioned pair of dies, the open ends of the tubular die elements being engageable with opposite sides of a pocket and adapted to pinch together the opposite walls of the tube to form a seam, stripper plates surrounding the tubular die elements each having an outer pocket-engaging face, each of said stripper plates being slidable on its respective tubular die element between a pocket-compressing position wherein its outer face is forward of the pinching end of the tubular die element and a retracted position clear of said pinching end, and spring means normally maintaining said plates in their pocket-compressing position, said plates being movable relatively to the tubular die elements against the bias of said spring means to their retracted positions upon engagement with opposite sides of the pocket as the die elements move toward one another.

23. A capsule making machine as set forth in claim 22, including mechanism for reciprocating said reciprocating dies and said tubular die elements in such phase relationship that the said reciprocating dies pinch the tube before the tubular die elements come into engagement with the opposite sides of the pocket.

24. A capsule making machine as set forth in claim 22, wherein said tubular die elements are reciprocated by mechanism adapted to move them toward the tube initially at relatively high speed and ultimately at low speed as they approach their closed position engaging opposite sides of the pocket.

25. A capsule making machine comprising a pipe, web feeding apparatus for feeding a pair of webs of flexible capsule-shell-forming material on opposite sides of the pipe past its outlet end, means for forming the webs into a tube around the pipe by longitudinally pressing the webs together on opposite sides of the pipe to form tube seams, a pair of dies movable toward and away from the pipe on opposite sides of the latter formed to longitudinally compress the seams on opposite sides of the pipe, mechanism operating in timed relation to the dies for periodically delivering a dose of capsule filling material through the pipe into the tube, and a pair of capsule-forming dies movable toward and away from the tube on opposite sides of the latter beyond the first-mentioned pair of dies and including open-ended tubular die elements the ends of which are engageable with opposite sides of the tube to pinch together opposite walls of the tube to form a seam confining the dose within a generally spheroidal shell of capsule-shell-forming material.

26. A capsule making machine comprising a set of parallel, spaced-apart nozzles, apparatus for forming tubes of flexible capsule-shell-forming material, one around each nozzle, and for feeding the tubes past the outlet ends of the nozzles, comprising means for feeding a pair of webs of capsule-shell-forming material on opposite sides of the set of nozzles, means for longitudinally pressing the webs together on opposite sides of the nozzles to form tube seams on opposite sides of the nozzles, and a pair of reciprocating dies movable toward and away from the set of nozzles on opposite sides of the latter formed to longitudinally compress the seams on opposite sides of each nozzle, mechanism operating in timed relation to the dies for periodically delivering doses of capsule filling material through the nozzles into the respective tubes, and a pair of capsule-forming dies reciprocable toward and away from the tubes on opposite sides of the latter beyond the first-mentioned pair of dies and including open-ended tubular die elements the ends of which are engageable with opposite sides of the tubes to pinch together opposite walls of the tubes to form seams confining each dose within a generally spheroidal shell of capsule-shell-forming material.

27. A capsule making machine as set forth in claim 26, wherein each capsule-forming die includes a stripper plate surrounding its tubular die elements and having an outer tube-engaging face, said plate being slidable on the tubular die elements between a tube-compressing position wherein its outer face is forward of the pinching ends of the tubular die elements, said plates being normally maintained in their tube-compressing position and movable relatively to the tubular die elements to their retracted positions upon engagement with opposite sides of the tube as the capsule-forming dies move toward one another.

28. A capsule making machine as set forth in claim 26, wherein each capsule-forming die includes a plate surrounding its tubular die elements and having an outer tube-engaging face, said plate being slidable on the tubular die elements between a tube compressing-position wherein its outer face is forward and a retracted position to allow the tubular die elements to sever the capsules, said plate functioning to force the doses into the areas within the tubular die elements so that substantially all of said doses will be contained in capsules that are formed by the machine.

REX E. MOULE.

REFERENCES CITED

The following references are of record in the file of this patent:

UNITED STATES PATENTS

| Number | Name | Date |
| --- | --- | --- |
| 1,970,396 | Scherer | Aug. 14, 1934 |
| 2,279,505 | Ravenscroft | Apr. 14, 1942 |
| 2,288,327 | Scherer | June 30, 1942 |
| 2,292,760 | Kath | Aug. 11, 1942 |
| 2,309,545 | Scherer | Jan. 26, 1943 |
| 2,323,581 | Weckesser | July 6, 1943 |
| 2,390,337 | Spotz | Dec. 4, 1945 |